United States Patent
Kumar et al.

(10) Patent No.: US 12,354,110 B2
(45) Date of Patent: Jul. 8, 2025

(54) USER-FRIENDLY SMART CONTRACT AUTHORING ON DISTRIBUTED LEDGER

(71) Applicant: SAP SE, Walldorf (DE)

(72) Inventors: Abhinav Kumar, Bengaluru (IN); Vikas Rohatgi, Bengaluru (IN)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 18/496,552

(22) Filed: Oct. 27, 2023

(65) Prior Publication Data

US 2025/0139633 A1 May 1, 2025

(51) Int. Cl.
*H04L 9/00* (2022.01)
*G06Q 20/36* (2012.01)
*G06Q 20/40* (2012.01)

(52) U.S. Cl.
CPC ........... *G06Q 20/405* (2013.01); *G06Q 20/36* (2013.01)

(58) Field of Classification Search
CPC ........................................................ H04L 9/50
See application file for complete search history.

(56) References Cited

U.S. PATENT DOCUMENTS

| | | | | |
|---|---|---|---|---|
| 4,730,259 A * | 3/1988 | Gallant | ................. | G06N 3/042 706/903 |
| 11,783,252 B1 * | 10/2023 | Edwards | ................. | G06F 40/40 705/7.25 |
| 12,120,251 B2 * | 10/2024 | Ma | ...................... | G06F 11/3684 |
| 2023/0118380 A1 * | 4/2023 | Krosinski | ............ | G06Q 20/405 705/44 |
| 2023/0367566 A1 * | 11/2023 | Dubrofsky | .............. | G06F 8/427 |
| 2024/0394648 A1 * | 11/2024 | Maikhuri | ........... | G06Q 10/0835 |

OTHER PUBLICATIONS

OpenZepplin | docs, "Defender Admin", retrieved from: https://docs.openzeppelin.com/defender/admin, 34 pgs.
OpenZepplin | docs, "Defender Autotasks", retrieved from: https://docs.openzeppelin.com/defender/autotasks, 14 pgs.
Agustinus Theodorus, "How to Develop a Solidity Smart Contracts Using Hardhat", LogRocket Frontend Analytics, Mar. 22, 2022, 22 pgs., retrieved from: https://blog.logrocket.com/develop-solidity-smart-contracts-hardhat/.
CSIRO, "Blockchain Patterns—Escrow", 5 pgs., retrieved from: https://research.csiro.au/blockchainpatterns/general-patterns/blockchain-payment-patterns/escrow-2/.

* cited by examiner

*Primary Examiner* — William E Rankins
(74) *Attorney, Agent, or Firm* — Fountainhead Law Group, PC

(57) ABSTRACT

A computer-implemented user-friendly system and method of designing and managing smart contracts on a distributed ledger (blockchain). The system creates a number of computer programs that correspond to a business user's model of the contract terms. In this manner, the business user can generate the smart contract without needing to understand programming or involve third parties like developers.

20 Claims, 22 Drawing Sheets

| If | | Then |
|---|---|---|
| Order.Material_ID = | Order.ActualDeliveryDate − Order.ExpectedDeliveryDate | transferFund |
| 'Widget' | >= '3 D' AND <= '5 D' | Order.Quantity * Order.Price * 0.8 |
| 'Widget' | >= '6 D' AND <= '10 D' | Order.Quantity * Order.Price * 0.6 |
| 'Widget' | > '11 D' | Order.Quantity * Order.Price * 0.5 |
| 'Gadget' | >= '2 D' | Order.Quantity * Order.Price * 0.9 |
| * | * | Order.Quantity * Order.Price |

101, 102, 103, 104, 105

Decision Table 100

```
/*
Facade per Contract. This is the only public interface of the Contract to the
outside world.

The Facade doesn't get changed with deployment of new Contract Version. The
Facade maintains address of the latest contract (latest Rule) to reach to it.

Being the central component, it exposes all the public functions to be used
by end-users (participants) and other functionalities (eg. Escrow, Multi Sign
Waller, Latest Contract (Rule) etc.)

The facade also runs a loop till effectivity time defined in metadata to
check any newly minted blocks. The newly minted block is then passed to
latest contract (latest Rule) for evaluation against contract terms.
*/ pragma solidity ^0.8.0;

import "./MultiSigWallet.sol";
import "@openzeppelin/contracts/utils/structs/EnumerableSet.sol";

contract RuleFacade {
    // address of the latest version of Rule representing the Contract.
This will be keep changing to always point to latest contract version
    address internal latestContract;

// author of the contract address
    internal author;

// time till which the rules remain effective
    uint256 internal effectivity;

// Multisign Wallet - It is created per Contract Version
    MultiSigWallet internal wallet;

/* Variables to maintain state reg. which blocks are already processed.
    Note: The Facade detects a newly minted block (via Event Loop) and
sends it to Latest Contract (Rule) Version to processes the terms transaction
in newly minted block against the contract terms and takes action if the
terms are satisfied.
    */
    uint internal lastProcessedBlockNumber;
    uint internal lastBlockMinted;

// variable to ensure that contract is deactivated once it is executed
    bool internal isActive;
```

FIG. 4A

```
        // address of purchaser
        address internal purchaser;

// address of vendor
        address internal vendor;

/* Eg. the contract may be between SAP (Purchaser) and Apple (Vendor).
Then purchaser will have address of SAP and vendor will have address of Apple
        */

/* Participants who need to approve (sign) before the contract is
activated. Eg. the contract may be between SAP (Purchaser) and Apple
(Vendor). Two employees from SAP and Three employees from Apple may be
designated to drive the contract. Then these 5 participants need to sign
before the contract becomes effective.
        */
        address[] internal participants;

// event for newly minted block
        event NewBlockMinted(uint blockNumber);

constructor(address _latestContract, address[] _participants, uint
_amount, address _purchaser, address _vendor, uint256 _effectivity) {
                purchaser = _purchaser;
                vendor = _vendor;
                latestContract = _latestContract;
                participants = _participants;
                effectivity = _effectivity;
                isActive = true;

wallet = new MultiSigWallet(participants, purchaser, amount);

lastProcessedBlockNumber = block.number;

author = msg.sender;

subscribeToEvent();
                start();
        }

/* function to update the address of latest contract and its meta
information. This function will be called whenever new version of contract is
deployed.
        */
        function updateLatestContract(address _latestContract, address[]
_participants, uint _amount, address _purchaser, address _vendor, uint256
_effectivity) external {
                require(msg.sender == author, "Only the author can update the
latest contract");
```

FIG. 4B

```
            //create new instance of multi sign wallet based on changed
contract terms
            MultiSigWallet newWallet = new MultiSigWallet(participants,
sender, amount);

//update meta information based on changed contract terms
            purchaser = _purchaser;
            vendor = _vendor;
            latestContract = _latestContract;
            participants = _participants;
            effectivity = _effectivity;
            isActive = true;

lastProcessedBlockNumber = block.number;

// cancel the previous wallet, to release amount from escrow
            wallet.cancel();
            wallet = newWallet;
        }

// internal function to run loop every 10 second to check for any newly
minted block.
        function start() internal {
            uint256 nextCheckTime = block.timestamp + 10;
            uint256 stopTime = block.timestamp + effectivity;
            while (block.timestamp < stopTime) {
                if (block.timestamp >= nextCheckTime) {
                    checkForNewBlock();
                    nextCheckTime = block.timestamp + 10;
                }
            }
        }

// internal function to subscribe to NewBlockMinted event - which is
emitted whenever a newly minted block is detected.
        // handleNewBlockMinted function is called in response to this event.
        function subscribeToEvent() internal {
            this.NewBlockMinted(handleNewBlockMinted);
        }

// internal function to detect any newly minted block
        function checkForNewBlock() internal {
            // Get the current block number
            uint256 currentBlock = block.number;

// Check if a new block has been minted
            if (currentBlock > lastBlockMinted && isActive) {
                // Emit the event with the new block number
                emit NewBlockMinted(currentBlock);
```

FIG. 4C

```
            // Update the last block minted
            lastBlockMinted = currentBlock;

// Update the last processed block number
            lastProcessedBlockNumber = currentBlock;
        }
    }

// function to approve the contract. Participants will be calling this
function to approve the contract
    function approve() public {
        require(participants.contains(msg.sender), "Only participant can
approve the contract");
        wallet.approve(msg.sender);
    }

// function to deposit the money (Ether) in Escrow account. The
purchaser will be calling this function to deposit the amount.
    function deposit() public returns (bool) {
        require(purchaser == msg.sender, "Only depositor can call this
function");
        return wallet.deposit(msg.sender);
    }

// function to send the money (Ether) to vendor from Escrow account.
The latest contract (latest rule) will be calling it in case contract terms
are satisfied
    function sendEther(uint256 amount) public returns (bool) {
        require(msg.sender == latestContract, "Function can only be
called from latest contract.");
        require(isActive == true, "Contract is already deactivated
because it has executed once.");
                if(wallet.sendEther(vendor, amount)) {
                    isActive = false;
                }
    }
```

FIG. 4D

```
        /* function to handle the NewBlockMinted event. The function takes the
block number of the block to be processed. This is public function and can be
invoked from outside in case there were failures while sending money (Ether)
and now requires manual intervention. Note: The function only takes
blockNumber not any transaction details so that no-one can execute contract
against forged transaction details. The return of the function is a json
stating if the given block is successfully processed or not. This can be used
to manual trigger a block, if required
        */
        function handleNewBlockMinted(uint256 blockNumber) public returns
(string memory) {
                require(isActive == true, "Contract is already deactivated
because it has executed once.");
                return invokeLatestContract(blockNumber);
        }

/* internal function which invokes latest compiled contract (latest
rule) for evaluation of transactions against contract conditions.
        The return of the function is a json stating if the given block is
successfully processed or not. The details of the failed blocks can possibly
be maintained as state in the contract which can be queried by stakeholders
to re-try (in case of failure).
        */
        function invokeLatestContract(uint256 blockNumber) internal returns
(string memory) {
                require(isActive == true, "Contract is already deactivated
because it has executed once.");
                require(latestContract != address(0x0), "No latest contract
set");
                bool success = false;

/* call actual latest rule for evaluation - the call takes
following address of this facade - to call the sendEther function block
number - to extract transactions which need to be check against contract
terms address of vendor and purchaser - to see that transactions occurred
between the said parties. lastProcessedBlockNumber - block number of last
processed block
                */

(success, ) =
latestContract.call(abi.encodeWithSignature("execute(address,uint,address,add
ress,unit)",
address(this),blockNumber,purchaser,vendor,lastProcessedBlockNumber));

string memory jsonString = string(abi.encodePacked('{"success":
', success ? 'true' : 'false', ', "blockNumber": ', blockNumber.toString(),
'}'));
                return jsonString;
        }
}
```

FIG. 4E

```
/* There will be one instance of Multi Sign Wallet per Contract Version. The
Multi Sign Wallet ensures that all the participants have approved the
contract before it comes in effect. The Multi Sign Wallet also instantiates
the Escrow account (per Contract Version) and ensures its lifecycle (deposit
money in Escrow, cancel, etc.)
*/ pragma solidity ^0.8.0;

import "./Escrow.sol";

contract MultiSigWallet {
      /* Participants who need to approve (sign) before the contract is
activated. Eg. the contract may be between SAP (Purchaser) and Apple
(Vendor). Two employees from SAP and Three employees from Apple may be
designated to drive the contract. Then these 5 participants need to sign
before the contract becomes effective.
      */
      address[] internal participants;

// the account from which the money (ether) will be deposited in Escrow
account
      address internal depositor;

// internal map to maintain state of which participants has approved
the contract
      mapping (address => bool) internal hasApproved;

// variable to store paricipants size
      uint internal requiredApprovals;

// configuration to re-try payment thrice with backoff time of 10
seconds
      uint256 constant MAX_RETRIES = 3;
      uint256 constant BASE_BACKOFF_TIME = 10; // In seconds // Escrow account details
      Escrow internal escrow;

// state to check id amount is deposited in Escrow or not
      bool internal deposited = false;

// address of creator - Rule Facade in this case (Facade creates Multi
Sign wallet using new keyword per Contract Version)
      address internal creator;
```

FIG. 5A

```
/* constructor - takes address of depositor, amount required to kept in
Escrow account and paricipants list who need to approve before contract comes
in force, The details of depositor and amount is used to create Escrow
Account
*/
constructor(
        address[] memory _participants,
        address payable _depositor,
        uint _amount
) {
        require(_participants.length > 0, "Participants required");

for (uint i = 0; i < _participants.length; i++) {
            address participant = _participants[i];
            require(participant != address(0), "Invalid address");
            require(!hasApproved[participant], "Duplicate address");
            hasApproved[participant] = false;
            participants.push(participant);
        } requiredApprovals = _participants.length;
        depositor = _depositor;

escrow = new Escrow(depositor, _amount);

creator = msg.sender;
}

// function to mark approval by a participant. Once all the
participants have approved the contract comes in force
    function approve(address participant) public {
        require(msg.sender == creator, "Function can only be called by creator.");
        require(hasApproved[participant] == false, "Already approved");
        hasApproved[participant] = true;
    }
```

FIG. 5B

```
    // function to deposit money (Ether) in escrow account. Only depositor
can deposit amount
    function deposit(address _depositor) public returns (bool) {
        require(msg.sender == creator, "Function can only be called by
creator.");
        require(_depositor == depositor, "Only depositor can call this
function");

// money (Ether) can be deposited only if all the participants
has approved the contract
        if (isApproved()) {
            if (escrow.deposit()) {
                deposited = true;
                return true;
            }
        }
        return false;
    }

// convince function to check if contract is fully approved and the
amount is deposited in Escrow
    function isApprovedAndAmountBlocked() public view returns (bool) {
        return deposited && isApproved();
    }

// convince function to check if contract is fully approved
    function isApproved() public view returns (bool) {
        uint approvalCount = 0;
        for (uint i = 0; i < participants.length; i++) {
            if (hasApproved[participants[i]]) {
                approvalCount++;
            }
        }
        if (hasApproved[author]) {
            approvalCount++;
        }
        return approvalCount >= requiredApprovals;
    }
```

FIG. 5C

```
        // function to send money (Ether) to given account when the contract
conditions (modelled as Rule) are fulfilled.
        // The function does the re-tries in exponential back-off fashion to
deal with any intermittent failures.
        function sendEther(address payable recipient, uint256 amount) public
returns (bool) {
                require(msg.sender == creator, "Function can only be called by
creator.");
                require(isApprovedAndAmountBlocked(), "Either Contract is
not approved or the amount is not deposited in Escrow");
                bool success = false;
                uint256 retries = 0;
                while (!success && retries < MAX_RETRIES) {
                        uint256 backoffTime = BASE_BACKOFF_TIME * 2**retries;
                        success = escrow.release(recipient, amount);
                        if (!success) {
                                retries += 1;
                                if (retries < MAX_RETRIES) {
                                        // Exponential back-off
                                        uint256 random =
uint256(keccak256(abi.encodePacked(block.timestamp, block.difficulty,
retries)));
                                        uint256 delay = random % backoffTime;
                                        block.timestamp += delay;
                                }
                        }
                }
                return success;
        }

// function to cancel the contract and return the money (Ether) from
Escrow account
        function cancel() public {
                require(msg.sender == creator, "Function can only be called by
creator.");
                escrow.cancel();
        }
}
```

FIG. 5D

```
/* There will be one instance of Escrow account per Contract Version.

This Escrow account (techically impemented as contract) will hold money
(Ethers) which will be transfered as per contract terms.

This Escrow contract acts as a third party which receives and disburses money
(Ethers) for the primary transacting parties, with the disbursement dependent
on conditions agreed to by the transacting parties.

Note: All the functions can be invoked only by creator (ie. Multi Sign Wallet
in this case)
*/ pragma solidity ^0.8.0;

contract Escrow {
    // address of depositor - account which deposits money (Ether) in
Escrow
    address internal depositor;

// amount which needs to be deposited in Escrow
    uint internal amount;

// variables to maintain state
    bool internal released;
    bool internal deposited;
    bool internal canceled;

// address of creator - Multi Sign Wallet in this case (As Multi Sign
Wallet creates Escrow account using new keyword per Contract Version)
    address internal creator;

// constructor - takes address of depositor and amount required to kept
in Escrow
    account constructor(address _depositor, uint _amount) {
        require(_depositor != address(0), "Invalid depositor address");
        require(_amount > 0, "Invalid amount");

depositor = _depositor;
        amount = _amount;

creator = msg.sender;
    }
```

FIG. 6A

```
    // function to deposit amount in Escrow. It has validation that the
deposited amount is equal to one defined during contract creation
    function deposit() public payable returns(bool) {
        require(msg.sender == creator, "Function can only be called by
creator.");
        require(msg.value == amount, "Deposit amount must be equal to
amount");
        require(!deposited, "Already deposited");

deposited = true;
        return true;
    }

// function to release the said amount to given address. It will be
triggered when the contract conditions are met.
    // If the total amount transferred is less than amount stored in
Escrow, the remaining will be transferred back to the depositor.
    function release(address _payee, uint256 amountToPayPayee) public
payable returns(bool) {
        require(deposited, "Funds not yet deposited");
        require(msg.sender == creator, "Function can only be called by
creator.");
        require(!released, "Already released");
        require(amountToPayPayee <= amount, "Cannot send more amount than
total");

released = true;
        payable(_payee).transfer(amountToPayPayee);
        payable(depositor).transfer(amount - amountToPayPayee);
        return true;
    }

// function to cancel and return the deposited amount to depositor. It
may be triggered if new version of Contract is deployed.
    function cancel() public payable returns(bool) {
        require(msg.sender == creator, "Function can only be called by
creator.");
        require(!canceled, "Already canceled");
        canceled = true;
        payable(depositor).transfer(amount);
        return true;
    }
}
```

FIG. 6B

```
/* Contract representing the latest terms. There will be one contract
instance per Contract Version representing the terms modelled in that
Contract.

This is the place where contract terms are evaluated against transactions in
block.
*/ pragma solidity ^0.8.0;

import "ds-json/json.sol";
import "github.com/ethereum/solidity-examples/contracts/utils/
JSONFormatter.sol";

contract Rule_RuleVersion {

// Reference for json handling
    using dapphub_json for bytes;
    using dapphub_json for string;

// Reference to utility library to access utility functions
    using Utility for uint256;

//internal function to read value for given key. The block's
transaction data is converted in json and read via this function
    function readJsonKey(string memory jsonString, string memory key)
internal pure returns (bytes32) {
        bytes memory jsonBytes = bytes(jsonString);
        bytes32 keyHash = keccak256(bytes(key));
        bytes memory valueBytes = jsonBytes.get(keyHash);
        string memory valueString = valueBytes.toString();

return bytes32(valueString);
    }
```

FIG. 7A

```
    //internal function to convert string to address - part of contract
term (rule) translation
    function stringToAddress(string memory _address) internal pure returns
(address) {
        bytes memory _addressBytes = bytes(_address);
        require(_addressBytes.length == 42, "Invalid address length: must
be 42 characters");
        require(_addressBytes[0] == byte('0') && _addressBytes[1] ==
byte('x'), "Address must start with '0x'");
        bytes20 _bytes = bytes20(0);
        for (uint i = 2; i < 42; i += 2) {
            _bytes |= bytes20(_addressBytes[i]) << (40 - i * 8);
        }
        return address(_bytes);
    }

//internal function to get days difference between two dates - part of
contract term (rule) translation
    function dateDiff(bytes32 startDate, bytes32 endDate) internal pure
returns (int256) {
        uint256 startTimestamp = uint256(startDate);
        uint256 endTimestamp = uint256(endDate);
        if (endTimestamp < startTimestamp) {
            return -1;
        }
        return int256(endTimestamp - startTimestamp);
    }

// function to send Money (Ether) when rule condition is satisfied - it
delgates call to Facade (which in turn delates to Multi Sign Wallet)
    function sendEther(uint256 amount, address _facade) internal returns
(bool) {
        require(_facade != address(0), "No facade set");
        bool success = false;
        // call rule execution
        (success, ) =
_facade.call(abi.encodeWithSignature("sendEther(uint256)", amount));
        require(success, "Failed to invoke execute function of latest
contract");
        success = true;
        return success;
    }
```

FIG. 7B

```
    /* function which is called by the Facade. It takes the blockNumber -
all the transactions in the given block is evaluated against specified
contract terms.
    The transaction data is converted into json and then the contract terms
are evaluated against the json data.
    The function also takes the metadata like purchaser, vendor details to
process transactions involving only these parties. (Else the contract term
evaluation is not triggered altogether).
    Further, the contract takes some technical parameters like facade
address to call public method exposed by it.
    */ function execute(address _facade, uint blockNumber, address _purchaser,
address _vendor, uint lastProcessedBlockNumber) public returns (bool) {
        // Process the new block
        bytes32 blockHash = blockhash(blockNumber);
        require(blockHash != bytes32(0), "Block not found");
        uint256 numTransactions = block.number ==
lastProcessedBlockNumber ? block.transactions.length - 1 :
block.transactions.length;
        for (uint256 i = 0; i < numTransactions; i++) {
            address sender = block.transactions[i].from;
            address receiver =
address(bytes20(block.transactions[i].input[4:24]));
            if (sender == _sender && receiver == _receiver) {
                bytes memory txData = block.transactions[i].input;
                string memory json = JSONFormatter.toJSON(txData);
                execute(json, _facade);
            }
        } return true;
    }
```

FIG. 7C

```
        // internal function to evaluate contract terms. It takes block
transaction data as json for evaluation against modelled contract terms
(latest rules)
        function execute(string jsonFacts, address _facade) internal
returns(bool) {
                //check if contract is approved and amount is blocked then only
run it
                if (!_wallet.isApprovedAndAmountBlocked()) {
                        return false;
                } bytes32 materialId = readJsonKey(jsonFacts, "Material_Id");
                bytes32 actualDateOfDelivery = readJsonKey(jsonFacts,
"ActualDeliveryDate");
                bytes32 expectedDateOfDelivery = readJsonKey(jsonFacts,
"ExpectedDeliveryDate");
                bytes32 quantity = readJsonKey(jsonFacts, "Quantity");
                bytes32 price = readJsonKey(jsonFacts, "Price");

if (materialId == "Widgets" && dateDiff(expectedDateOfDelivery,
actualDateOfDelivery) >= 3 && dateDiff(expectedDateOfDelivery,
actualDateOfDelivery) <= 5) {
                        sendEther(quantity * price * 80 / 100, _facade);
                } else if (materialId == "Widgets" &&
dateDiff(expectedDateOfDelivery, actualDateOfDelivery) > 6 &&
dateDiff(expectedDateOfDelivery, actualDateOfDelivery) < 10) {
                        sendEther(quantity * price * 60 / 100, _facade);
                } else if (materialId == "Widgets" &&
dateDiff(expectedDateOfDelivery, actualDateOfDelivery) >= 11) {
                        sendEther(quantity * price * 50 / 100, _facade);
                } else if (materialId == "Gadgets" &&
dateDiff(expectedDateOfDelivery, actualDateOfDelivery) >= 2) {
                        sendEther(quantity * price * 90 / 100, _facade);
                }
                return true;
        }
}
```

FIG. 7D

USER-FRIENDLY SMART CONTRACT AUTHORING ON DISTRIBUTED LEDGER

CROSS REFERENCE TO RELATED APPLICATIONS

Not applicable.

BACKGROUND

The present invention relates to distributed ledgers, and in particular, to smart contracts implemented on distributed ledgers like a blockchain.

Unless otherwise indicated herein, the approaches described in this section are not prior art to the claims in this application and are not admitted to be prior art by inclusion in this section.

Contracts are useful to manage the terms of the interactions between entities. However, contracts implemented in a traditional manner have a number of issues. First, traditional contracts often require manual processing, which can be time-consuming and error prone. Second, there is always a trust issue that the involved parties will fulfill their obligations: to address this problem, traditional contracts often require intermediaries or third-party enforcement (e.g., a court or arbitrator). Third, traditional contracts can be costly due to the need for intermediaries, legal fees, and other associated costs. Fourth, traditional contracts can be difficult to enforce, especially in cross-border transactions where legal systems may differ.

To address these issues, the smart contract was invented. Smart contracts are self-executing contracts that are designed to enforce the terms of an agreement between two or more parties using blockchain technology. They are essentially computer programs on a distributed ledger (blockchain) that can be triggered to execute the terms of a contract when defined conditions are met.

Smart contracts are stored on distributed ledgers like a blockchain, which allows for secure and transparent record-keeping. The distributed ledgers like blockchain provides a tamper-proof and transparent record of the contract, which ensures that all parties have access to the same information and that the terms of the contract are enforceable.

Smart contracts can be used anywhere traditional contracts are used. For example, in the case of a financial transaction, a smart contract could automatically execute the transfer of funds from one party to another when certain conditions are met, such as the completion of a delivery. Similarly, a smart contract can also enforce liquidated damages clauses easily without any bias or conflict between parties.

Smart contracts have several potential advantages over traditional contracts, including greater efficiency, transparency, and security. They also reduce the need for intermediaries, such as lawyers and bankers, and can provide greater certainty and predictability in the enforcement of contracts.

Smart contracts have potential to become an increasingly important tool for businesses and individuals seeking to execute contracts in a secure, efficient, and transparent manner.

SUMMARY

However, smart contracts face a number of issues. The first issue is technical complexity. Smart contracts can be complex to design and implement, which may require specialized technical skills, and business users cannot model the contracts themselves. This not only increases the cost to create the smart contracts but may result in situations where the contract requirements are not completely understood by the developer.

The second issue is programming errors. Smart contracts are essentially computer programs, and like all software they are vulnerable to programming errors or bugs. It may require a lot of automated and manual testing and debugging, resulting into higher costs to develop smart contracts.

The third issue is immutability. Once a smart contract is deployed on the blockchain, it cannot be modified or updated. Creating a new version of contract is again a tedious process, and it becomes even harder with the life-cycle requirement to always trigger the latest version of the contract.

The fourth issue is less readability. As smart contracts are essentially computer programs, they are not very intuitive for business users to read, understand and verify the encoded terms.

The fifth issue is resiliency requirements like auto-recovery from any intermittent failures. Therefore, it is important to write special logic to keep the smart contract resilient against any unlikely or unexpected situations that may arise, which increases the complexities and development costs. Resiliency is an important requirement for any computer program including smart contracts, as they are essentially computer programs and can experience intermittent failures, such as when nodes are busy. Smart contracts can be programmed to handle these resiliency requirements, for example by retrying a failed transaction multiple times, for example with an exponential back-off strategy. However, adding these capabilities can significantly increase the development cost of the smart contract.

The sixth issue is capturing mutual agreement from a business point of view. Currently it is difficult to verify and ensure that all parties involved in a smart contract transaction have agreed to the terms encoded in the contract (code) before the contract is executed, for example by capturing the agreement via the digital signatures or digital approvals of all involved parties.

The seventh issue is trust between parties that they have sufficient funds to fulfill the contract obligations. While parties may agree to terms and conditions through a smart contract, verifying that a party (purchaser) has enough funds to fulfil the contract's terms is challenging. Implementing manual escrow accounts or wallets can be an expensive task.

The eighth issue is smart contract invocation automation. Currently, the execution of smart contracts requires manual triggering by one of the involved parties, for example by using web3.js to trigger smart contracts stored on a distributed ledger like a blockchain. This manual step may also be prone to misuse, especially if the contract lacks proper security checks (e.g., a vendor triggering the contract without supplying the goods). Moreover, ensuring correct security checks requires expertise and increases the cost of development of smart contracts. To overcome these limitations, it is preferable to fetch transaction information directly from the blockchain- or from third-party systems (e.g., an ERP system not on the blockchain) via trusted oracles-enabling automatic triggering of smart contracts when the conditions are satisfied, thus making the process fully automated.

Considering the existing business and technical drawbacks associated with smart contracts, there is a need for a mechanism that can help involved parties in deriving such smart contracts in an easy manner.

As further described herein, embodiments are directed to design time tools to make modeling the smart contract easy for users, and to development tools that compile the modeled smart contract into code that can be executed on a distributed ledger, among other features. These tools address the issues identified above at less cost and in a more user-friendly manner than addressing them manually.

In one embodiment, a method models and generates smart contracts on a distributed ledger. The method includes receiving, by a computer system, a first user input including a number of rules. The rules include if-then statements, and the rules model contract terms. The method includes receiving, by the computer system, a second user input that configures configuration parameters for the rules that model the contract terms. The method includes executing, by the computer system, a rules compiler, where executing the rules compiler includes reading the rules and the configuration parameters. Executing the rules compiler further includes generating, by the rules compiler, a first computer program representing a rule façade program, where the rule façade program provides public interfaces to a smart contract on the distributed ledger. Executing the rules compiler further includes generating, by the rules compiler, a second computer program representing a multi-sign wallet program, where the multi-sign wallet program includes a list of approvers for the smart contract, and where the rule façade program provides functional access to the multi-sign wallet program. Executing the rules compiler further includes generating, by the rules compiler, a third computer program representing an escrow account program, where the escrow account program identifies a sender address, a recipient address and an escrow amount. Executing the rules compiler further includes generating, by the rules compiler, a fourth computer program representing a rules contract program, where the rules contract program includes the rules that model the contract terms, and where the rules façade program provides functional access to the rules contract program. The smart contract then comprises the first computer program, the second computer program, the third computer program and the fourth computer program.

The rules compiler may generate additional computer programs that comprise the smart contract.

A computer readable medium may store a computer program for controlling a computer to implement one or more steps of the above methods.

A system may implement one or more steps of the above methods, using one or more computer systems (e.g., a server computer, a database system, a client computer, etc.) to perform one or more of the method steps.

The subject matter described in this specification can be implemented to realize one or more of the following advantages. The rule façade eases the management of various contract versions by always invoking the latest one. The rule façade is stable across versions, providing an easy point of interaction for users. The multi-sign wallet improves establishing mutual agreement for smart contracts by explicitly capturing the business concurrence of the contract terms. The escrow account improves the confidence of involved parties that others will be able to fulfill their obligations by holding funds with it. The rules contract is equivalent to the contract terms defined by a user using rule software (e.g., decision table, text rule, etc.), thereby improving readability, providing for user-friendly updating of contract terms, and reducing programming errors as now the user can easily model the contract terms in a user-friendly manner without coding. Together, these components of the smart contract work in tandem to provide benefits like resiliency, auto-recovery, etc. as further described herein.

The following detailed description and accompanying drawings provide a better understanding of the nature and advantages of the present invention.

BRIEF DESCRIPTION OF THE DRAWINGS

FIGS. 4A-4E show sample code for the rules façade 302.

FIGS. 5A-5D show sample code for the multi-sign wallet 304.

FIGS. 6A-6B show sample code for the escrow account 306.

FIGS. 7A-7D show sample code for the rules contract 308.

DETAILED DESCRIPTION

Figure 1:
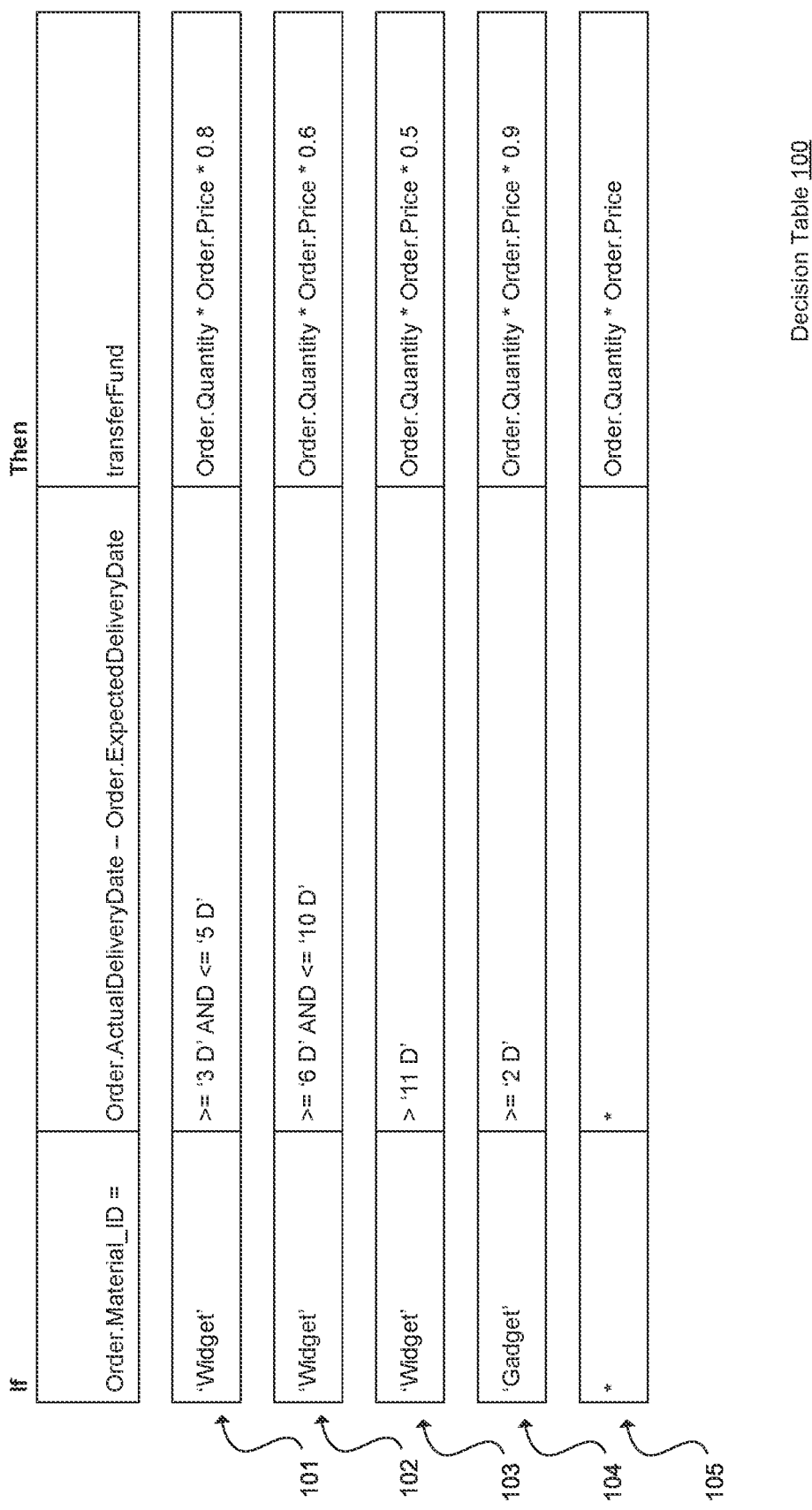
FIG. 1 is a graphical view of a decision table 100.

Described herein are techniques for automating the creation of smart contracts, including modeling tools, design time tools, etc. In the following description, for purposes of explanation, numerous examples and specific details are set forth in order to provide a thorough understanding of the systems and methods described herein. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed.

Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the term "server" is used. In general, a server is a hardware device, and the descriptor "hardware" may be omitted in the discussion of a hardware server. A server may implement or execute a computer program that controls the functionality of the server. Such a computer program may also be referred to functionally as a server, or be described as implementing a server function: however, it is to be understood that the computer program implementing server functionality or controlling the hardware server is more precisely referred to as a "software server", a "server component", or a "server computer program".

In this document, the term "database" is used. In general, a database is a data structure to organize, store, and retrieve large amounts of data easily. A database may also be referred to as a data store. The term database is generally used to refer to a relational database, in which data is stored in the form of tables and the relationship among the data is also stored in the form of tables. A database management system (DBMS) generally refers to a hardware computer system (e.g., persistent memory such as a disk drive or flash drive, volatile memory such as random access memory, a processor, etc.) that implements a database.

In this document, the terms "to store", "stored" and "storing" are used. In general, these terms may be used to refer to an active verb (e.g., the process of storing, or changing from an un-stored state to a stored state), to a state of being (e.g., the state of being stored), or both. For example, "storing a data record" may be used to describe the process of storing (e.g., the data record transitioning from the un-stored state to the stored state). As another example, "storing a data record" may be used to describe the current state of a data record (e.g., the data record currently exists in the stored state as a result of being previously stored). When only a single interpretation is meant, such meaning will be apparent from the context.

A noteworthy feature of embodiments is that they automate generating the smart contract from the contract terms written by the business user, without requiring the business user to know any programming. Consider the following contract terms:

If Widgets and Gadgets are delivered on time, pay the price per Widget times the quantity of widgets, and the price per Gadget times the number of Gadgets.

If Gadgets are delivered after 2 days of expected delivery date then there will be penalty of 10%.

If Widgets are delivered after 3 to 5 days of expected delivery date then there will be penalty of 20%.

If Widgets are delivered after 6 to 10 days of expected delivery date then there will be penalty of 40%.

If Widgets are delivered after 11 days of expected delivery date then there will be penalty of 50%.

The business user can easily model these terms using business rules software. The business rules software is a tool that the business user uses to model the terms of the contract as part of creating the smart contract. Examples of the business rules software include a business rule authoring tool, a decision table tool, an if-then rule tool, a rules service tool, etc. The business rules software may also include large language model (LLM) support. The decision table tool is discussed in more detail below: a similar tool may be used to implement the "if-then" statements directly, as the decision table tool and the if-then tool just differ in user interface but represent the same thing (the contract terms). The business rule authoring tool may implement rules in decision model notation (DMN) or other types of formalized modeling formats. The business rules software may use pre-trained LLMs and use deep learning techniques to generate rules for the contract terms already defined in documents or contract repositories. For example, when the contract terms are agreed over email in the English language, the email is fed to the LLM which generates the rules (e.g., in decision table format).

FIG. 1 is a graphical view of a decision table 100 that includes the example contract terms discussed above. The five terms of the contract are represented in five rows of the decision table 101, 102, 103, 104 and 105. The columns of the decision table provide the matching criteria for the rules as the "if" columns, and the operations (such as transferring funds) in the "then" column. The business user may use a computer system to implement a decision table tool as part of a contract rules authoring tool (see also FIG. 8), with the business user using the business rules software to create the decision table and to fill in the contract terms in the appropriate places. The decision table tool may implement functionality such as add row, delete row, copy row, cut row, paste row, etc. The decision table tool may pull in metadata from other line of business (LoB) systems like enterprise resource planning systems, human capital management systems, etc. For example, the LoB systems may provide the vocabulary on which the rules (contract terms) may be written, such as the Order object containing fields like Material_Id, ActualDelivery Date, etc. The business rules software may implement this functionality using a vocabulary provider tool (see FIG. 8). Further mapping cryptic material identifiers such as M000001_01 to "Widget" may be done in the business rules software via value help to enable the business user to model the contract terms.

Similarly, the business rules software may provide access to utility functions during rules modeling, for example when the business user is using the decision table. These kinds of utility functions can be already exposed by a developer for easy and quick use by business users when modeling the rules. For example, for the Ethereum blockchain, the developer may program the utility functions using the Solidity object-oriented programming language; the business user does not need to know programming. Examples of utility functions include converting between Fahrenheit and Celsius, between pounds and kilograms, a function to get the current time, etc.

Once the business user has modeled the rules using the business rules software, the business user uses the computer system to configure additional configuration parameters of the contract, such as the involved parties, the contract participants, the escrow account value, the effectivity, and the contract execution policy.

The involved parties may be identified by their addresses on the blockchain. For example, the vendor may be VI, which is linked to a VI-controlled address on the blockchain, and the purchaser may be PI, which is linked to a PI-controlled address on the blockchain. This information may be used to filter out the transactions involving only the concerned parties.

The contract participants may be identified by their addresses on the blockchain. The contract participants need to approve (sign) the contract before it becomes effective. For example, PI may have designated employees (Employee E1 and Employee E2) who needs to review the contract terms and sign: similarly VI may have their designated employees (Employee E3, Employee E4 and Employee E5) who needs to review the contract terms from their side and sign before the contract becomes effective.

The escrow account value corresponds to an amount that is to be stored in an address on the blockchain, to be held as collateral to ensure that both parties fulfill their obligations as agreed upon in the contract. The configuration may take the monetary amount that is held securely in the address on the blockchain generated as part of compiling the smart contract. This mechanism provides a level of security and trust between the parties engaged in the transaction.

The effectivity is the date until which the contract terms are valid.

The contract execution policy defines how many times a rule (representing contract terms and conditions) should be re-evaluated after it has been evaluated successfully at least once. For example, if the Purchaser expects the Vendor to deliver all items together, the policy can state a value of 1, meaning the rule should not be evaluated again once it is successfully evaluated once. Conversely, if the Purchaser has no such requirement, the value can be set to "*" to indicate that the rule should be continuously evaluated until the effectivity date. For example, the Purchaser might want all the ordered items together from the Vendor to avoid overhead.

An example of another policy is the matching policy. Under a first match policy, once the system has evaluated one row as true, no further rows will be evaluated. Under an all match policy, the system evaluates all rows, and more than one row may evaluate as true.

As mentioned above, on the blockchain all the entities (e.g., Vendor, Purchaser, Participants, etc.) are identified by address. The address is generally a long, hexadecimal string of characters, which is difficult to read, write and understand. The business user may simplify it using the pre-configured value help, where the computer system provides mappings between blockchain addresses and named entities. Further, the value of these pre-configured value help can be provided as environment variables at deployment time (late-binding).

The above process may be generally referred to as the modeling stage. After the modeling stage, the user triggers the deployment stage. In the deployment stage, the computer system automatically generates the smart contract based on the rules model and deploys it on the blockchain. The operational stage follows the deployment stage. In the operational stage, the generated smart contract is executed as the blocks of the blockchain are processed, to evaluate whether the terms of the contract are met. These stages are further detailed below.

Figure 2:
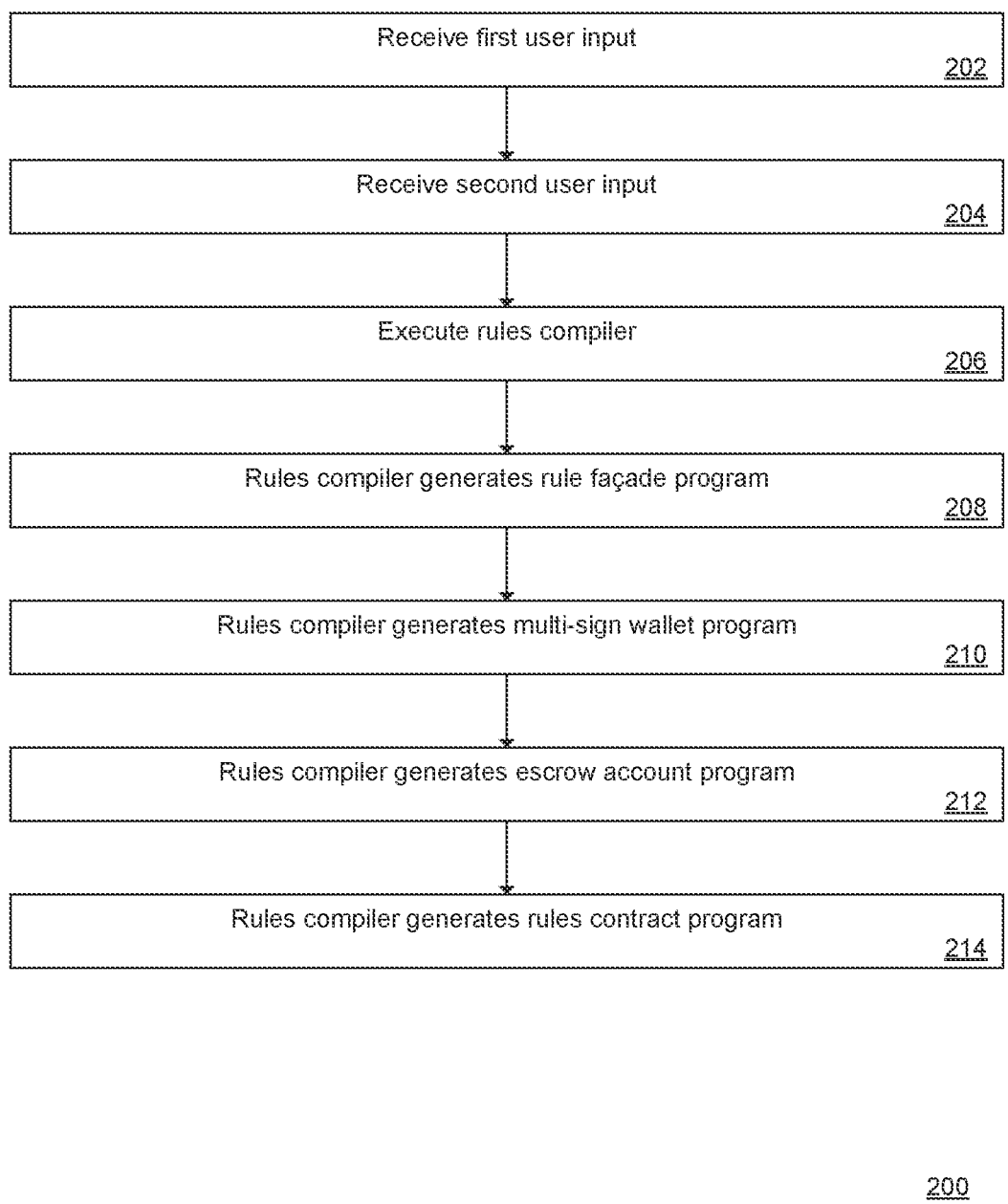
FIG. 2 is a flow diagram of a method 200 of generating and deploying smart contracts on a blockchain.

FIG. 2 is a flow diagram of a method 200 of generating and deploying smart contracts on a distributed ledger (e.g., a blockchain). The method 200 may be implemented by a computer system, for example as controlled by executing one or more computer programs. The method 200 may include other steps that (for brevity) are not discussed in detail.

At 202, a first user input is received by the computer system. The first user input includes a number of rules, where the rules includes a number of if-then statements. The if-then statements may be obtained from a decision table (see FIG. 1), from text rule modeling, etc. The rules model the contract terms. For example, the first user input may correspond to the business user entering the contract terms into a decision table as shown in FIG. 1. That the business user is able to model the terms of the contract without needing the involvement of programming experts is a noteworthy feature of the embodiments described herein.

At 204, a second user input is received by the computer system. The second user input configures a number of configuration parameters for the rules that model the contract terms. For example, the second user input may correspond to the details of the involved parties, the contract participants, the escrow account value, the effectivity, the contract execution policy, etc. That the business user is able to set the configuration parameters of the contract without the involvement of programming experts is a noteworthy feature of the embodiments described herein.

At 206, the computer system executes a rules compiler. (Further details of the rules compiler are provided with reference to FIG. 9.) Executing the rules compiler includes reading the rules and the configuration parameters, and executing the rules compiler generates a number of computer programs that implement a smart contract. As a specific example, the rules compiler may generate four computer programs, as detailed in 208, 210, 212 and 214.

At 208, the rules compiler generates a first computer program representing a rule façade program. The rule façade program provides a number of public interfaces to the smart contract on the distributed ledger. The rule façade program also remains constant if a new version of the smart contract is generated, as it is a public interface. In this context, "public interface" does not mean that the functions of the smart contract are generally accessible to the public: instead "public interface" refers to the access to the functions of the smart wallet that is granted to the parties identified by the multi-sign wallet, as discussed below.

At 210, the rules compiler generates a second computer program representing a multi-sign wallet program. The multi-sign wallet program includes a list of approvers for the smart contract. The rule façade program provides functional access to the multi-sign wallet program for signing by the approvers.

At 212, the rules compiler generates a third computer program representing an escrow account program. The escrow account program identifies a sender address, a recipient address and an escrow amount. The multi-sign wallet program provides functional access to the escrow account program. Alternatively, the functional access to the escrow account program may be via another program component of the smart contract, such as the rule façade program.

At 214, the rules compiler generates a fourth computer program representing a rules contract program. The rules contract program includes the rules that model the contract terms. The rules façade program provides functional access to the rules contract program. Alternatively, the functional access to the rules contract program may be via another program component of the smart contract.

The smart contract then comprises the first computer program, the second computer program, the third computer program and the fourth computer program. The smart contract may also include other computer programs to implement additional functionality for the smart contract, for example advanced security functionality. The smart contract may include fewer computer programs than the four detailed herein: for example, the escrow account program (and its corresponding step 212) may be omitted.

In summary, embodiments are directed to a system that in design time enables a business user to model a smart contract with a low entry barrier: the system compiles the model on-the-fly to generate the smart contract. The four computer programs described above form one solution to address these issues.

As mentioned above, steps 202 and 204 correspond to the modeling stage. Steps 206, 208, 210, 212 and 214 correspond to the deployment stage. The operational stage corresponds to the execution of the various programs of the smart contract on the distributed ledger. The method 200 may include additional steps, as follows.

The method 200 may include deploying the smart contract on the distributed ledger.

The method 200 may include periodically monitoring the distributed ledger by the rule façade program, where monitoring the distributed ledger includes detecting a new block on the distributed ledger. When the new block is detected, the rule façade program creates an event, and an event handler program evaluates the rules contract program against at least one transaction in the new block (e.g., all the transactions in the new block, one by one).

The method 200 may include receiving, by the computer system, a third user input that indicates deployment of a new version of the smart contract. For example, the user can modify the rules (see 202) or the configuration parameters (see 204) using the modeling tools to generate the new version. The rules compiler generates an updated multi-sign wallet program related to the new version of the smart contract, and a version manager (see FIG. 8) deploys the updated multi-sign wallet program. The compiler of the computer system generates the class definition for the updated escrow account program, and the updated multi-sign wallet program instantiates the updated escrow account program (e.g., via keyword) by passing parameters to configure the class definition correctly for the new version of the smart contract. The rules compiler generates an updated rules contract program related to the new version of the smart contract, and the version manager deploys the updated rules contract program.

The method 200 may include the rule façade program periodically monitoring the distributed ledger, where monitoring the distributed ledger includes detecting a new block on the distributed ledger. The rule façade program then invokes the rules contract program when the new block is detected.

The method 200 may include detecting a failure in executing a transaction by the escrow account program. The transaction is based on the "then" part of the rule, and generally transfers a defined amount. For example, the transaction may be sending an amount of Ether when the rule evaluates to true. When the failure in executing the transaction has been detected, the escrow account program periodically re-tries the transaction. The periodic re-tries may be performed using an exponential back-off strategy.

The method 200 may include executing, by the escrow account program, a function to release the escrow amount to the recipient address when a condition of the smart contract is met. Releasing the escrow amount may also release a portion of the funds back to the depositor, for example in the case of liquidated damages.

The method 200 may include detecting, by the rules façade program, a new block on the distributed ledger. The rules contract program executes a function to evaluate the rules against at least one transaction in the new block. Generally the rules are evaluated against all transactions in the new block, one by one.

The rules compiler may include a rule parser, and the method 200 may include parsing, by the rule parser, the rules to generate an intermediate representation. The intermediate representation corresponds to a structured model of the rule expressions of the rules. Parsing the rule expressions includes performing one or more of lexical analysis, syntax analysis and semantic analysis.

The rules compiler may include a code generator, and the method 200 may include storing a code template and converting, by the code generator, the rules into the rules contract program using the code template.

The rules compiler may include a performance optimizer, and the method 200 may include generating, by the rules compiler, a first version of the rules contract program, and optimizing, by the performance optimizer, the first version of the rules contract program. Optimizing the first version of the rules contract program includes removing a redundancy from the first version of the rules contract program and generating a second version of the rules contract program.

Figure 3:
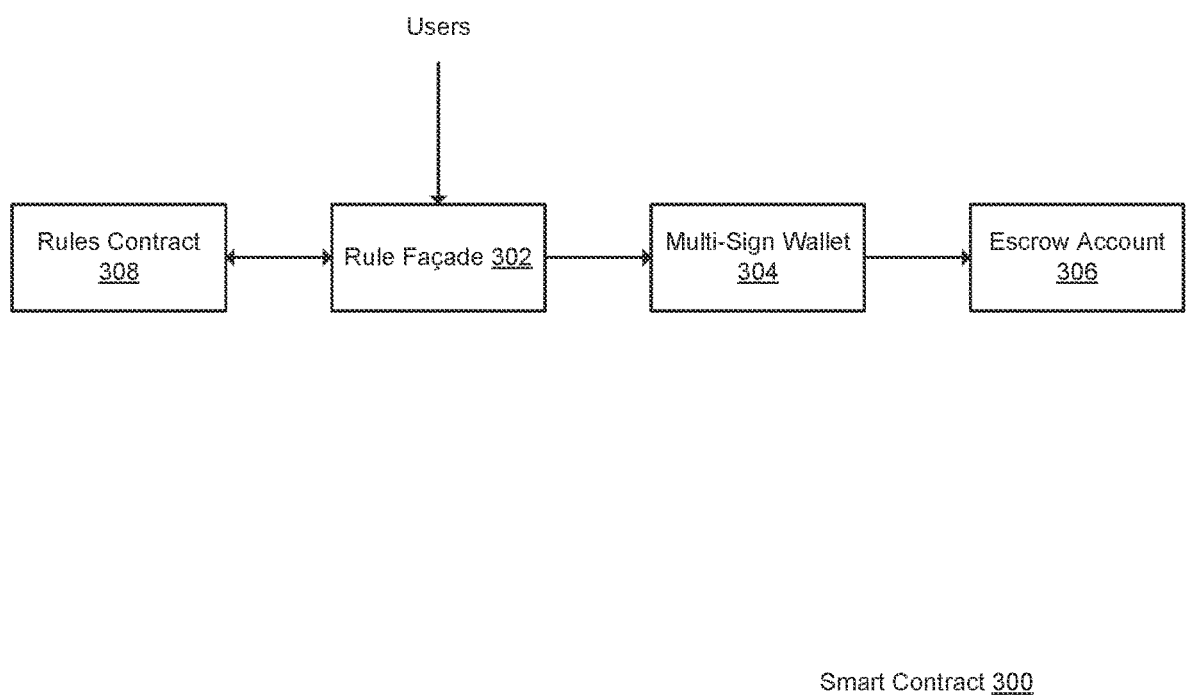
FIG. 3 is a block diagram of a smart contract program 300.

FIG. 3 is a block diagram of sample smart contract programs 300. The smart contract programs 300 may also be referred to as the smart contract 300. The smart contract 300 is deployed on the distributed ledger and may be generated by the rules compiler performing the method 200 (see FIG. 2), in a manner similar to that discussed above. The smart contract 300 includes a rule façade program 302 (also referred to as the rule façade 302), a multi-sign wallet program 304 (also referred to as the multi-sign wallet 304), an escrow account program 306 (also referred to as the escrow account 306), and a rules contract program 308 (also referred to as the rules contract 308). The smart contract 300 may include additional programs, or fewer programs than the four in the sample, and the functions of the smart contract 300 may be performed by programs other than in the examples discussed in more detail below.

The rule façade 302 is generated per contract and does not change even if the new version of the rule is created by the business user to represent the new terms and conditions. It is a stable façade exposed to the outside world: that is, the rule façade 302 provides indirect access to the other components of the smart contract 300. The rule façade 302 maintains the address of latest version of the rule.

The rule façade 302 periodically runs a loop to identify any newly minted block in the distributed ledger. If any newly minted block is identified, the rule façade 302 creates an event. The corresponding event handler evaluates the latest rule (contract) against the transactions in the newly minted block. The rule façade 302 may perform the loop every 10 seconds, and this duration can be adjusted by the user as part of configuring the smart contract. The rule facade 302 also maintains the state like Effectivity, isActive (in case the rule has to be deactivated after one successful evaluation), etc., to ensure that the loop is running only if the contract is still valid.

The rules compiler also instantiates the multi-sign wallet 304 (a new contract) on deployment of each new version of the rule (contract). The multi-sign wallet 304 provides functionality to participants to approve the contract before it becomes effective. The multi-sign wallet 304 is created per contract version as the participants, escrow amount value, etc. may change between different rule (contract) versions.

To keep the rule façade 302 independent of different rule versions, the rule façade 302 provides a function to update details, which is called during new version deployments. As the rule façade 302 is the only entity of the smart contract 300 exposed to the outside world, it provides all the public functions like a function to approve the contract by the participants, a function to deposit an amount in the escrow account (only after it is approved by all the participants), or a function to manually re-try a block in case of unsuccessful processing due to intermittent issues. (The details of the failed blocks may be maintained as state in the smart contract 300, which can be queried by stakeholders to re-try, in case of failure.) The functions may also include a function to send money (e.g., send Ether on the Ethereum blockchain), which is to be called by the latest contract, etc. Note that all these functions may be protected to be called only by authorized personnel (e.g., via a require keyword check in the Solidity language). Most of these functions act as proxies and delegate the real work to other contracts like approval to multi-sign contract, deposit to escrow contract, re-try to contract representing rule (contract), send money to escrow, etc.

FIGS. 4A-4E show sample code (Solidity code) that is generated by the rules compiler for the rules façade 302 for the example scenario mentioned above. As can be seen, the code sets up variables, events and functions that are used to fulfill the terms, conditions and configurations modeled by the business user as discussed above regarding FIG. 1. The code also generates the structure for the multi-sign wallet 304 (see FIG. 4C).

Returning to FIG. 3, the multi-sign wallet 304 is generated per rule version. The multi-sign wallet 304 is created by the rules compiler whenever a new rule (new contract) is deployed or a new rule version is created (update of contract). The multi-sign wallet 304 contains the list of all participants (who need to approve contract before it becomes active), the detail of the depositor (Purchaser), internal variables to maintain state (e.g., if the amount is already deposited, which all participants has already approved the contract, etc.). These details are passed to the multi-sign wallet 304 during construction from the rule façade 302. The rules compiler also creates a new instance of the escrow account 306 (a new contract).

The escrow account 306 provides functionality to participants to hold the escrow amount (e.g., Ethers) as configured in the rule. The escrow account 306 provides functions to deposit, send, cancel (send back money to depositor, if new version of contract is deployed), etc. In the example embodiment shown, the multi-sign wallet 304 provides proxy functions for all these escrow functions-which are in-turn called by the rule façade 302, as the only public view to the outside world. In other embodiments, the arrangements between the functional modules may differ.

The rules compiler also implements a retry capability which re-tries to send money (e.g., Ether) via the escrow account 306 a number of times to overcome any intermittent failures. In an embodiment, the re-try functionality is performed by the multi-sign wallet 304. The multi-sign wallet 304 may perform the retries using various strategies like an exponential back-off manner. The business user can configure the number of retries during configuration. Note that all the state changing functions are protected to be called only from the rule façade 302 (e.g., via a require keyword check in the Solidity language).

FIGS. 5A-5D show sample code (Solidity code) that is generated by the rules compiler for the multi-sign wallet 304 for the example scenario mentioned above. As can be seen, the code sets up the variables, constructors and functions that are used by the multi-sign wallet 304 as part of the smart contract 300. In this example, the code also instantiates the escrow account 306 (see FIG. 5B).

Returning to FIG. 3, the escrow account 306 is generated per rule version. In this example, the escrow account 306 is instantiated by the multi-sign wallet 304. The escrow account 306 provides functions to deposit the escrow value by the Purchaser, send the given amount (e.g., Ethers) to the Vendor, and cancel (to send back money to the depositor/purchaser) in the case when a new contract version is deployed. Note that all the functions are protected to be called only from the multi-sign wallet 302 (e.g., via a require keyword check in the Solidity language).

The functions may also include a check to ensure the functions are not called more than once: a check to ensure that the deposited amount in escrow is same as configured in the rule; and a check to ensure that if the amount to be sent is less than the escrow value (e.g., due to liquidated damages) then the balance is returned to the depositor.

FIGS. 6A-6B show sample code (Solidity code) that is generated by the rules compiler for the escrow account 306 for the example scenario mentioned above. As can be seen, the code sets up the variables, constructors and functions that are used by the escrow account 306 as part of the smart contract 300.

Returning to FIG. 3, the rules contract 308 represents the actual rules modeled in the decision table (or modeled in text rule format). This contract is generated per rule version. The execute function having the rule conditions (contract terms and conditions) is invoked by the rule façade 302 whenever a new block is minted. The rule execution ensures that the contract is already approved by all the participants and the configured escrow amount is already deposited before the rule evaluation. Further, the rule evaluation also takes care implicitly (not to be configured in rule conditions) that the transaction being evaluated is between the given parties (Purchaser and Vendor)—this check is important as the Vendor may be supplying the same goods on similar dates to different purchaser and the contract should not be triggered for these transactions. In the example shown, the rules contract 308 takes the address sent by the rule façade 302 to reach to it to invoke functions like send money (sendEther). The rule façade 302 passes the address as a function parameter to avoid cyclic dependency between the rules contract 308 and the rule façade 302. These functions may be performed by other programs in other embodiments.

FIGS. 7A-7D show sample code (Solidity code) that is generated by the rules compiler for the rules contract 308 for the example scenario mentioned above. As can be seen, the code sets up the variables, constructors and functions that are used by the rules contract 308 as part of the smart contract 300. Note that the specific contract terms of the contract modeled in the decision table 100 (see FIG. 1) are coded in the portion shown in FIG. 7D.

As shown in FIG. 3, the rules compiler compiles the rule to generate the 4 example contracts 302, 304, 306 and 308. Of these, only the rule façade 302 is exposed to the outside world: it is generated once per contract, independent of the number of versions deployed because of changing contract terms. The rule façade 302 provides methods to participants to approve the contract, to deposit the amount is escrow, to manually re-try a particular block in case of intermittent failure, etc. The rules contract 308, multi-sign wallet 304 and escrow account 306 are generated per rule version and are not exposed to the outside world.

After compilation by the rules compiler, the version manager takes the compiled contracts and deploys the smart contract 300 on the blockchain. In case of new rule version (update case), the rule façade 302 calls its updateLatestContract function to cancel the previous version (return the depositor/purchaser's money, etc.) and update the details of the new version. Note that after every new rule version is deployed, all the participants need to re-approve the latest contract and the depositor needs to again deposit the money (e.g., Ether) to the escrow account 306. This is required as the participant list and the escrow amount may change between different contract versions.

After deployment, the contract is automatically evaluated for each transaction in every newly minted block until the contract is active (as defined in contract configuration). The rule evaluation may need some real time data (like exchange rate, stock price, etc.) and such information can be retrieved via trusted oracles that are connected to third-party systems (like stock exchanges, banks, etc.) As can be seen, the entire process is fully automated after the deployment of the contract. The only manual steps are the approval of the contract by the participants (which is more like governance), the deposit of amount by Purchaser in the escrow account, and manual re-try of blocks in case of intermittent failures (which is ideally a very rare scenario due to the re-try functionality described above). These operations can be done by involved persons via web3.js interface provided by the blockchain. As can be seen, the system addresses and overcomes all eight of the issues identified in the Summary above with the smart contract 300. Although the concept of smart contracts was introduced by the Ethereum blockchain and most of this document uses the keywords and terms from Ethereum (e.g., Ether), the features described herein are applicable to any other blockchain, such as blockchains supporting contracts for decentralized finance, and non-fungible token (NFT) applications, etc.

Figure 8:
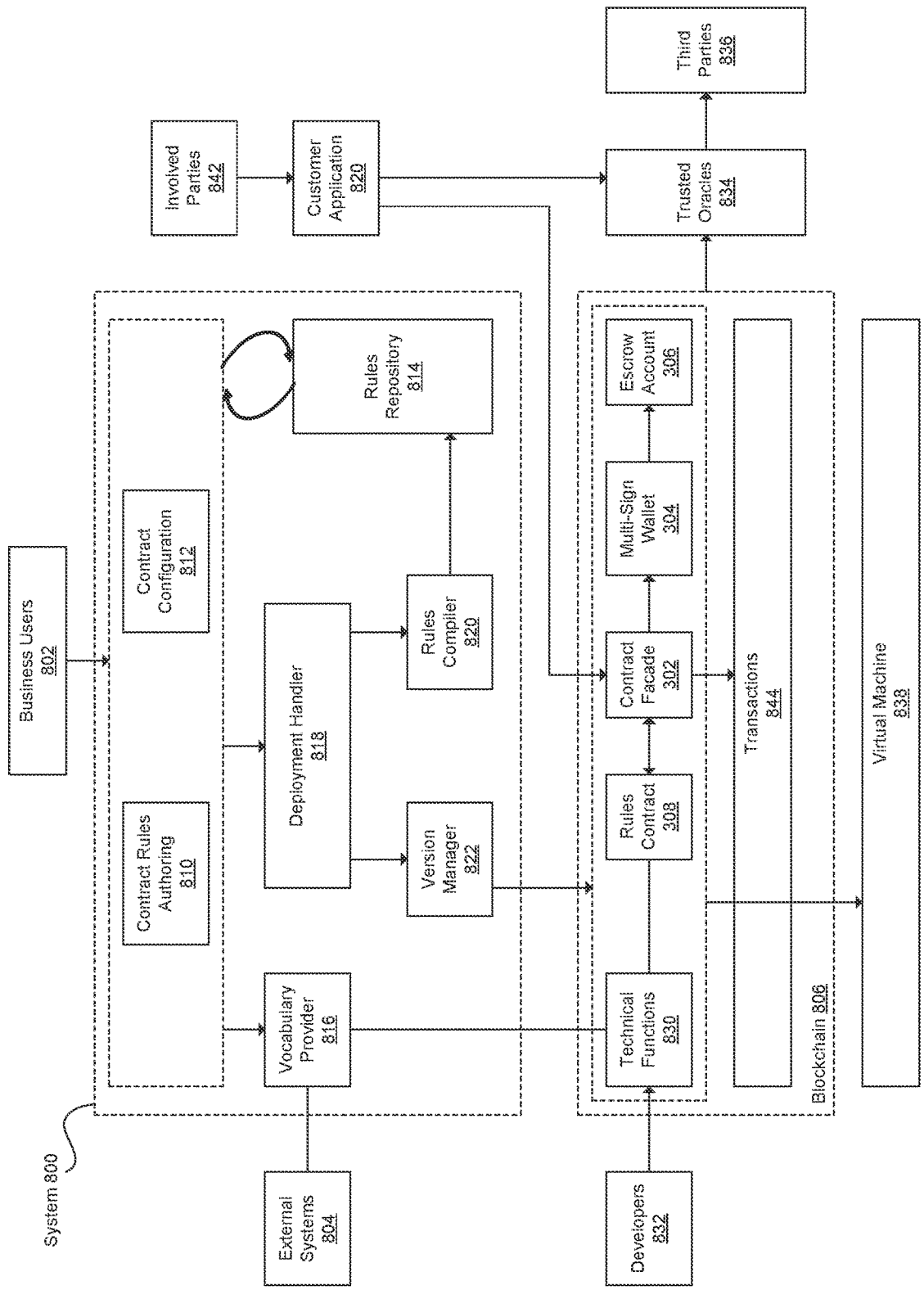
FIG. 8 is a block diagram of a system 800 for modeling and generating smart contracts.

FIG. 8 is a block diagram of a system 800 for user-friendly modeling and generating smart contracts. The system 800 interacts with other components, such as business users 802, external systems 804, and a blockchain 806. The system 800 may be implemented by one or more computer systems, for example as controlled by one or more computer programs, as further detailed below. The system 800 may include other components that (for brevity) are not discussed in detail. In general, the system 800 is used to create and operate a smart contract (e.g., the smart contract 300 of FIG. 3) on the blockchain 806, for example by executing the method 200 of FIG. 2 and other of the details discussed above. The system 800 includes a contract rules authoring tool 810, a contract configuration tool 812, a rules repository 814, a vocabulary provider tool 816, a deployment handler 818, a rules compiler 820, and a version manager 822.

The contract rules authoring tool 810 implements functionality for the business users 802 to model the contract terms and conditions in the form of a decision table or a set of text rules. The contract rules authoring tool 810 may implement a decision table tool for the business users 802 to fill in a decision table (as discussed above with reference to FIG. 1) and may implement a text rules tool for the business users 802 to enter the contract terms as if-then statements.

The contract configuration tool 812 implements functionality for the business users 802 to provide configuration details (configuration parameters) such as identifying the involved parties and their roles, the contract participants, the escrow account value, the contract effectivity, the contract execution policy, etc. The contract configuration tool 812 may also implement functionality to manage additional configuration parameters of the smart contract, such as the retry policy.

The rules repository 814 stores the business rules and configurations defined by the business users 802 using the contract rules authoring tool 810 and the contract configuration tool 812. Stated another way, the rules repository 814 stores the contract terms as modeled and configured by the business users 802.

The vocabulary provider tool 816 connects to the external systems 804 to pull in the vocabulary terms that the business users 802 use when modeling the rules using the contract rules authoring tool 810. The vocabulary terms correspond to the data fields of the databases stored by the external systems 804, which are then selectable for use when modeling the smart contract.

The external systems 804 store data that the business users 802 can use when configuring the smart contracts. For example, an enterprise resource planning (ERP) system may have a database of products with schema containing elements such as a product identifier, a product name, a product description, a price, a quantity on hand, a quantity in production, etc. The vocabulary provider tool 816 pulls these vocabulary terms from the data model of the ERP system, and the business user 802 may use (for example) the product name, quantity and price when modeling a smart contract.

The deployment handler 818 manages deployment of the smart contract on the blockchain 806. The deployment handler 818 works with the rules compiler 820 and the version manager 822 as part of this process.

The rules compiler 820 compiles the modeled rule and its configuration stored in the rules repository 814 to generate the smart contract. For example, the rules compiler 820 may generate the rule façade 302, the multi-sign wallet 304, the escrow account 306 and the rules contract 308 as part of generating the smart contract 300 (see FIG. 3). The rules compiler 820 may perform one or more of the steps of the method 200 (see FIG. 2). Further details of the rules compiler 820 are provided with reference to FIG. 9.

The version manager 822 takes care of version management for the smart contract 300, including deploying all the contracts (e.g., the rules façade 302, the multi-sign wallet 304, etc.) on the blockchain. When the smart contract 300 is updated, the version manager 822 calls the update function on the rules façade 302, which cancels the previous version of the smart contract 300. In such a case, the involved parties may need to re-approve the smart contract, deposit funds into escrow, etc.

The blockchain 806 is a distributed ledger that stores all transaction details in blocks, as transactions 844. The blockchain 806 also stores and executes computer programs, for example smart contracts. As a new block is added in the blockchain 806, each transaction is evaluated against the terms of the smart contract to see if any of the contract terms are met. An example of the blockchain 806 is an Ethereum blockchain. The blockchain 806 stores the rule façade 302, the multi-sign wallet 304, the escrow account 306, the rules contract 308, and a technical functions library 830. The blockchain 806 may also store other program components of the smart contract 300. The blockchain 806 interacts with developers 832, trusted oracles 834, third parties 836, a virtual machine 838, a customer application 840, and involved parties 842.

The technical functions 830 are utility functions such as unit conversion functions (e.g., pounds to kilograms, Fahrenheit to Celsius, etc.), formatting functions, etc. The vocabulary provider 816 provides these functions to the business users 802 for use when creating the smart contract. The utility functions themselves are computer programs that are pre-written by the developers 832: the business users 802 can then use the utility functions without needing any programming knowledge or mathematical knowledge (e.g., writing conversion formulas). On the Ethereum blockchain, the utility functions may be written in the Solidity programming language.

The trusted oracles 834 and the third parties 836 provide a data source for evaluating certain real-time attributes or conditions of the smart contract. The trusted oracles 834 act as the interface from the blockchain 806 to the third parties 836, and the third parties 836 provide the desired data. Examples of the third parties 836 include a time server, a bank or exchange rate server, a stock market or stock price server, etc. Another example of the third parties 836 is an ERP system or a LoB system for transactions, for the case when the ERP/LoB systems are not running on the blockchain but on traditional RDBMS. The trusted oracles 834 act as a bridge connecting the blockchain 806 and the third parties 836, enabling the smart contract 300 to access more than only on-chain data. In summary, the trusted oracles 834 provide a way to trigger smart contract functions using data provided by the third parties 836.

The virtual machine 838 executes the byte code that corresponds to the programs stored on the blockchain 806, such as the technical functions 830 and the smart contract (the rule façade 302, the multi-sign wallet 304, the escrow account 306, the rules contract 308, other programs), etc. The byte code is compiled from the object code that comprises the smart contract.

The customer application 840 is an application that the involved parties 842 use to interact with the blockchain 806 and the smart contract. The customer application interfaces with the rule façade 302, which then interfaces with the other components of the smart contract, as discussed above. The customer application 840 provides functions to approve the contract, to deposit money (Ether) into the escrow account, to manually re-try a block if there is a failure, etc. The customer application may be written using the web3.js programming language for the Ethereum blockchain.

The system 800 may also include machine learning or generative artificial intelligence (GenAI) components. For example, a GenAI component of the contract rules authoring tool 810 may directly generate the if-then statements in the decision table or text rule from the business document. The GenAI component may be trained on a corpus of business documents (e.g., contracts) and their corresponding decision table or text rule models. Once trained, the business user provides the business document (e.g., the contract to be modeled) to the GenAI, it fills in the decision table, and the business user reviews it and edits it as needed. The GenAI component may be trained in a variety of languages by using a number of language-specific corpuses (e.g., an English training corpus, a Spanish training corpus, a Hindi training corpus, etc.).

As another use case, the rules compiler 820 may include a GenAI component that directly generates the contract program code (e.g., Solidity code) using trained large language models of code.

Figure 9:
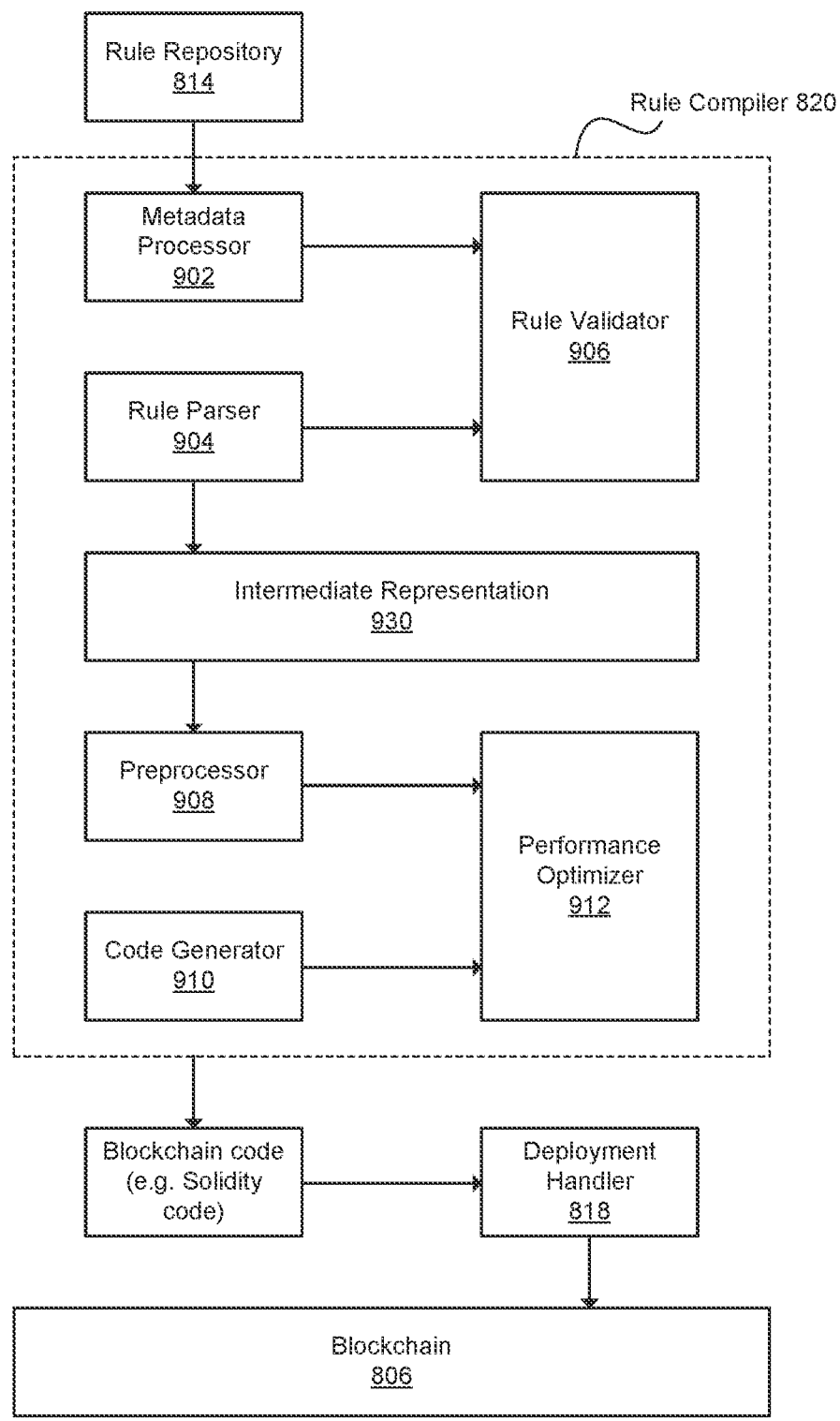
FIG. 9 is a block diagram showing additional details of the rules compiler 820 (see FIG. 8).

FIG. 9 is a block diagram showing additional details of the rules compiler 820 (see FIG. 8). The rules compiler 820 interacts with the rule repository 814 and the deployment handler 818 as shown in FIG. 8. The rules compiler 820 also interacts with the blockchain 806 when performing compilation, which acts like giving input and taking output. The rules compiler 820 includes a metadata processor 902, a rule parser 904, a rule validator 906, a pre-processor 908, a code generator 910, and a performance optimizer 912.

The metadata processor 902 reads the rule configurations (contract configurations) and the related metadata (such as the escrow account value, rule execution time, retry policy, etc.) for the smart contract stored in the rule repository 814 and extracts their information to be used by the rule parser 904.

The rule parser 904 parses the rule body and rule expressions to generate an intermediate representation 930. The rule body corresponds to the collection of modeled rules as if-then statements in the decision table or text rule. The rule expressions correspond to the components of each modeled rule. In other words, the rule body corresponds to the rows of the decision table 100 (see FIG. 1), and the rule expressions correspond to the cells of the decision table 100. For example, the row 104 in FIG. 1 includes three rule expressions: "Order. Material_ID=Gadget", "Order. ActualDelivery Date−Order. ExpectedDelivery Date>=2 D", and "Send_Money Order. Quantity*Order. Price*0.9".

The rule parser 904 may perform one or more of lexical analysis, syntax analysis, and semantic analysis. Lexical analysis breaks the expressions into tokens, such as operators, keywords and identifiers. Syntax analysis checks for the proper arrangement and sequencing of tokens to create a valid expression tree or representation. This ensures that the expressions adhere to the defined grammar and structure. Semantic analysis checks the validity and correctness of the expressions according to a defined semantic template.

The rule validator 906 performs validation on the rule body, the rule expressions and the rule configurations.

The intermediate representation 930 is a structured model between the modeled rules and the blockchain code (e.g., Solidity code for the Ethereum blockchain). The rule parser 904 translates the modeled rule body and rule expressions into an abstract syntax tree or object model to result in the intermediate representation 930.

The pre-processor 908 processes the intermediate representation 930 to conform the structured model output from the rule parser 904 into patterns more suitable for the code generator 910.

The code generator 910 stores a code template, analyzes the processed intermediate representation 930 from the pre-processor 908, and converts the intermediate representation 930 into code suitable for deployment on the blockchain 806. For example, for the Ethereum blockchain, the code generator 910 stores a code template in the Solidity language and fills in the code template with data from the intermediate representation 930.

An example code template is as follows:

```
If(<condition>){
    <action>
}
```

The code generator 910 then fills in the <condition> and the <action> based on the modeled rule.

The performance optimizer 912 optimizes the code output from the code generator 910. These optimizations may include the removal of overlapping conditions. For example, the rules template 100 (see FIG. 1) includes multiple conditions based on the same Material_ID of "Widget". If the code generator 910 initially generates code that checks Material_ID multiple times for "Widget", the performance optimizer 912 optimizes the code to only check one time.

As discussed regarding FIG. 8, the rules compiler 820 provides the code (e.g., Solidity code) to the deployment handler 818 for deployment on the blockchain 806.

As discussed above, the smart contract development systems described herein may provide a number of advantages as compared to existing systems, during both design time and run time. Design time advantages include reducing the technical complexity of smart contracts, improving their readability, and reducing programming errors, for example using the contract rules authoring tool 810, the contract configuration tool 812, and the rules compiler 820. Another design time advantage is improving the confidence of involved parties that others will be able to fulfill their obligations by holding funds, for example using the escrow account 306. One run time advantage is improving smart contract execution automation, for example using the rule façade 302. Another run time advantage is overcoming challenges in deploying new contract versions due to the immutable nature of the blockchain, for example using the rule façade 302 to provide a stable contract that always points to the latest contract version. Other run time advantages include auto-recovery and helping establish mutual agreement, for example using the multi-sign wallet 304.

Figure 10:
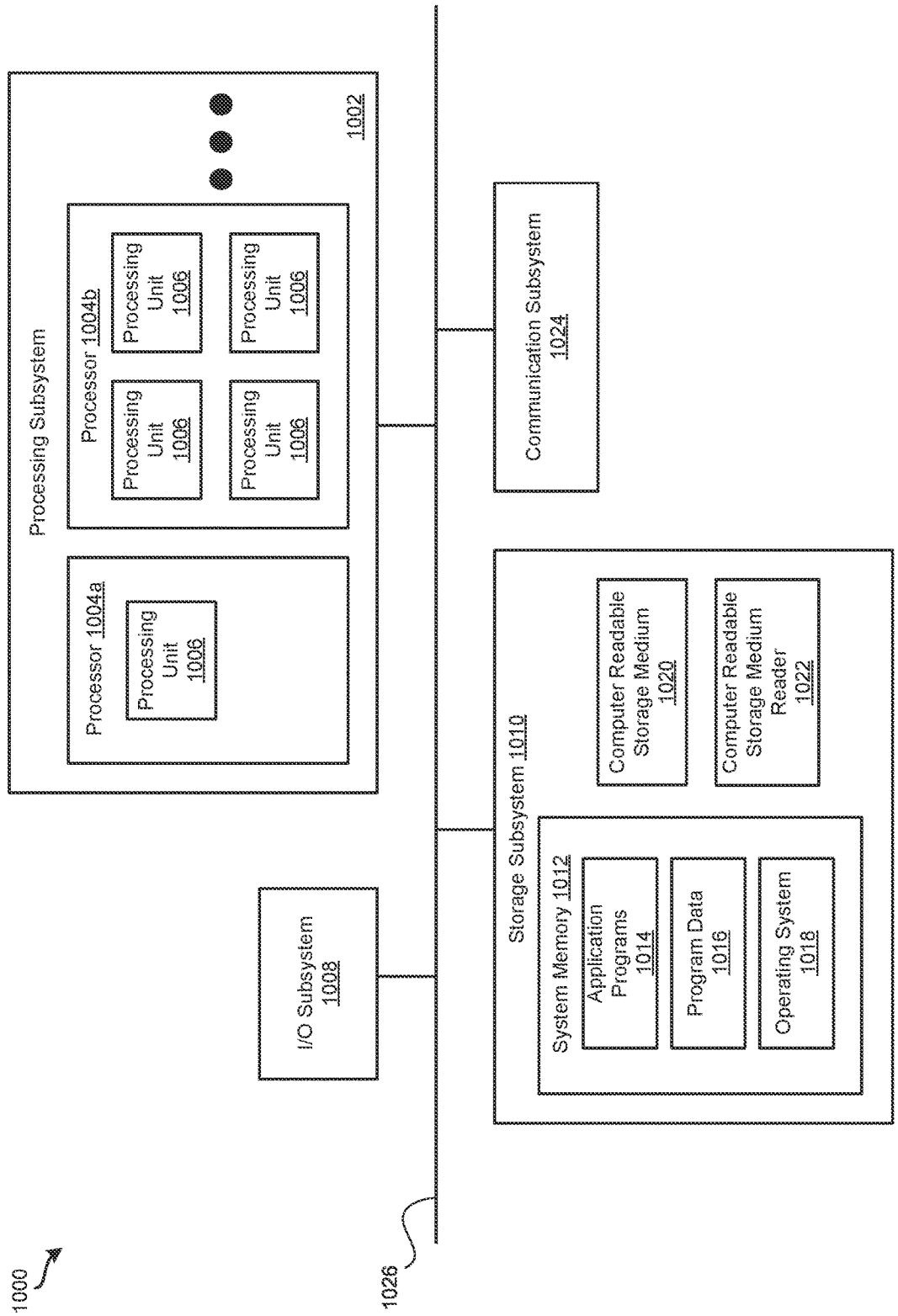
FIG. 10 is a block diagram of an example computer system 1000 for implementing various embodiments described herein.

FIG. 10 is a block diagram of an example computer system 1000 for implementing various embodiments described above. For example, the computer system 1000 may be used to implement the system 800 (see FIG. 8), etc. The computer system 1000 may be a desktop computer, a laptop, a server computer, or any other type of computer system or combination thereof. Some or all elements of the contract rules authoring tool 810, the contract configuration tool 812, the deployment hander 818, the rules compiler 820, etc. or combinations thereof can be included or implemented in the computer system 1000. In addition, the computer system 1000 can implement many of the operations, methods, or processes described above (e.g., the method 200 of FIG. 2, etc.). As shown in FIG. 10, the computer system 1000 includes a processing subsystem 1002, which communicates, via a bus subsystem 1026, with an input/output (I/O) subsystem 1008, a storage subsystem 1010 and a communication subsystem 1024.

The bus subsystem 1026 is configured to facilitate communication among the various components and subsystems of the computer system 1000. While the bus subsystem 1026 is illustrated in FIG. 10 as a single bus, one of ordinary skill in the art will understand that the bus subsystem 1026 may be implemented as multiple buses. The bus subsystem 1026 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

The processing subsystem 1002, which can be implemented as one or more integrated circuits (e.g., a conventional microprocessor or microcontroller), controls the operation of the computer system 1000. The processing subsystem 1002 may include one or more processors 1004. Each processor 1004 may include one processing unit 1006 (e.g., a single core processor such as the processor 1004*a*) or several processing units 1006 (e.g., a multicore processor such as the processor 1004*b*). In some embodiments, the processors 1004 of the processing subsystem 1002 may be implemented as independent processors while, in other embodiments, the processors 1004 of the processing subsystem 1002 may be implemented as multiple processors integrate into a single chip or multiple chips. Still, in some embodiments, the processors 1004 of the processing subsystem 1002 may be implemented as a combination of independent processors and multiple processors integrated into a single chip or multiple chips.

In some embodiments, the processing subsystem 1002 may execute a variety of programs or processes in response to program code and can maintain multiple concurrently executing programs or processes. At any given time, some or all of the program code to be executed may reside in the processing subsystem 1002 or in the storage subsystem 1010. Through suitable programming, the processing subsystem 1002 may provide various functionalities, such as the functionalities described above by reference to the method 200 (see FIG. 2), etc.

The I/O subsystem 1008 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, or other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, or other types of devices and mechanisms for outputting information from the computer system 1000 to a user or another device (e.g., a printer).

As illustrated in FIG. 10, the storage subsystem 1010 includes a system memory 1012, a computer-readable storage medium 1020, and a computer-readable storage medium reader 1022. The storage subsystem 1010 may implement the storage for the rules repository 814 (see FIG. 8), etc. The system memory 1012 may be configured to store software in the form of program instructions that are loadable and executable by the processing subsystem 1002 as well as data generated during the execution of program instructions. In some embodiments, the system memory 1012 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). The system memory 1012 may include different types of memory, such as static random access memory (SRAM) and/or dynamic random access memory (DRAM). The system memory 1012 may include a basic input/output system (BIOS), in some embodiments, that is configured to store basic routines to facilitate transferring information between elements within the computer system 1000 (e.g., during start-up). Such a BIOS may be stored in ROM (e.g., a ROM chip), flash memory, or another type of memory that may be configured to store the BIOS.

As shown in FIG. 10, the system memory 1012 includes application programs 1014 (e.g., that implement the system 800), program data 1016, and operating system (OS) 1018. The OS 1018 may be one of various versions of Microsoft Windows™, Apple Mac OS™, Apple OS X™, Apple macOS™, and/or Linux™ operating systems, a variety of commercially-available UNIX™ or UNIX-like operating systems (including without limitation the variety of GNU/Linux operating systems, the Google Chrome™ OS, and the like) and/or mobile operating systems such as Apple iOST, Windows Phone™, Windows Mobile™, Android™, BlackBerry OS™, Blackberry 10™, Palm OS™, and WebOS™ operating systems.

The computer-readable storage medium 1020 may be a non-transitory computer-readable medium configured to store software (e.g., programs, code modules, data constructs, instructions, etc.). Many of the components (e.g., the system 800, etc.) or processes (e.g., the method 200, etc.) described above may be implemented as software that when executed by a processor or processing unit (e.g., a processor or processing unit of the processing subsystem 1002) performs the operations of such components and/or processes. The storage subsystem 1010 may also store data used for, or generated during, the execution of the software.

The storage subsystem 1010 may also include the computer-readable storage medium reader 1022 that is configured to communicate with the computer-readable storage medium 1020. Together and, optionally, in combination with the system memory 1012, the computer-readable storage medium 1020 may comprehensively represent remote, local, fixed, and/or removable storage devices plus storage media for temporarily and/or more permanently containing, storing, transmitting, and retrieving computer-readable information.

The computer-readable storage medium 1020 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or other types of computer-readable storage media or device.

The communication subsystem 1024 serves as an interface for receiving data from, and transmitting data to, other devices, computer systems, and networks. For example, the communication subsystem 1024 may allow the computer system 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). The communication subsystem 1024 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth™, ZigBee™, etc., or any combination thereof), global positioning system (GPS) receiver components, or other components. In some embodiments, the communication subsystem 1024 may provide components configured for wired communication (e.g., Ethernet) in addition to or instead of components configured for wireless communication.

One of ordinary skill in the art will realize that the architecture shown in FIG. 10 is only an example architecture of the computer system 1000, and that the computer system 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
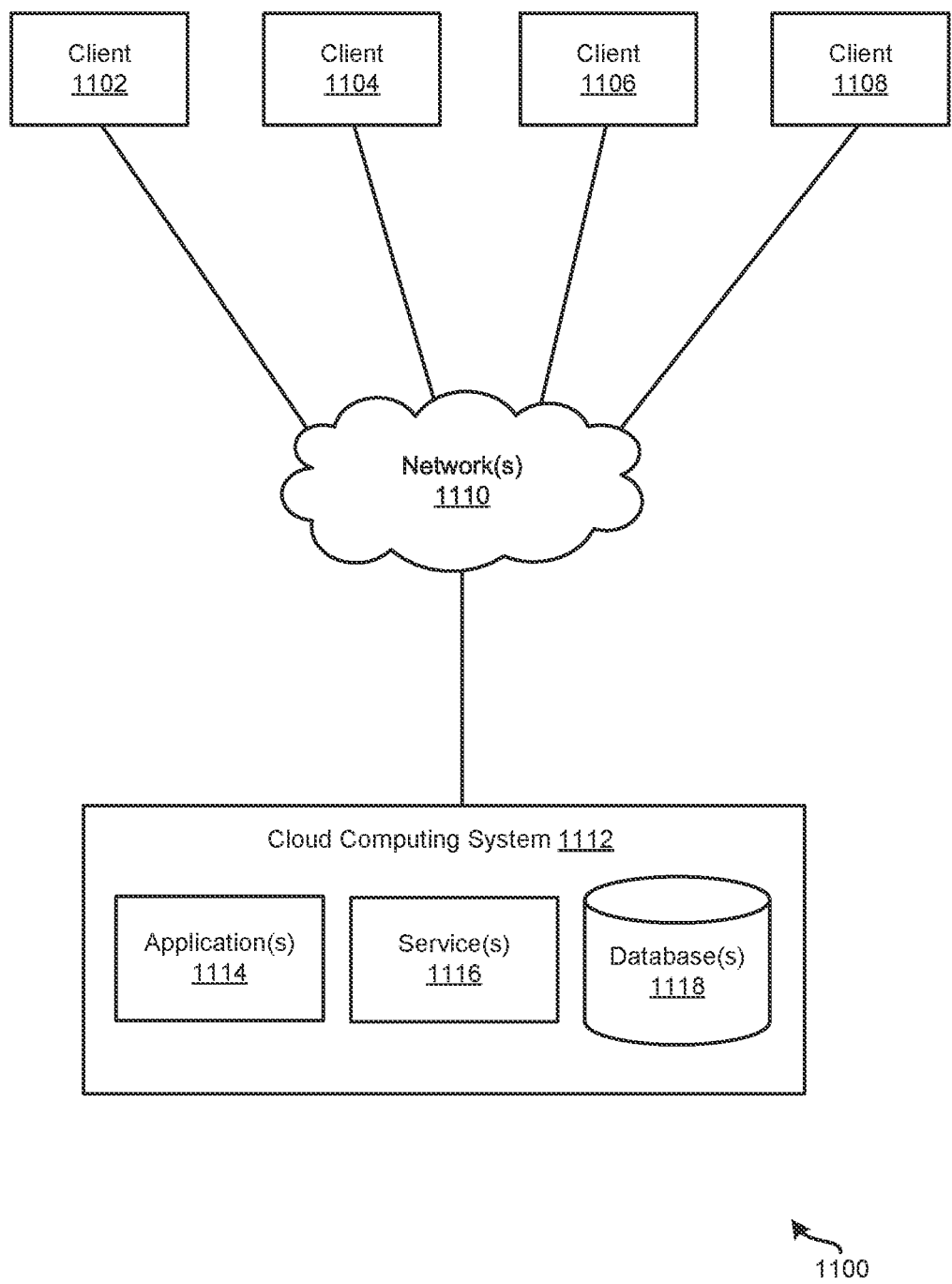
FIG. 11 is a block diagram of a cloud computing system 1100 for implementing various embodiments described herein.

FIG. 11 is a block diagram of a cloud computing system 1100 for implementing various embodiments described above. For example, one of the client devices 1102-1108 may be used to implement a client device for accessing the contract rules authoring tool 810 or the contract configuration tool 812 by a business user 802 (see FIG. 8), a cloud computing system 1112 of the system 1100 may be used to implement the rules compiler 820 or other components of the system 800, etc. As shown, the system 1100 includes the client devices 1102-1108, one or more networks 1110, and the cloud computing system 1112. The cloud computing system 1112 is configured to provide resources and data to the client devices 1102-1108 via the networks 1110. In some embodiments, the cloud computing system 1100 provides resources to any number of different users (e.g., customers, tenants, organizations, etc.). The cloud computing system 1112 may be implemented by one or more computer systems (e.g., servers), virtual machines operating on a computer system, or a combination thereof.

As shown, the cloud computing system 1112 includes one or more applications 1114, one or more services 1116, and one or more databases 1118. The cloud computing system 1100 may provide the applications 1114, services 1116, and databases 1118 to any number of different customers in a self-service, subscription-based, elastically scalable, reliable, highly available, and secure manner.

In some embodiments, the cloud computing system 1100 may be adapted to automatically provision, manage, and track a customer's subscriptions to services offered by the cloud computing system 1100. The cloud computing system 1100 may provide cloud services via different deployment models. For example, cloud services may be provided under a public cloud model in which the cloud computing system 1100 is owned by an organization selling cloud services and the cloud services are made available to the general public or different industry enterprises. As another example, cloud services may be provided under a private cloud model in which the cloud computing system 1100 is operated solely for a single organization and may provide cloud services for one or more entities within the organization. The cloud services may also be provided under a community cloud model in which the cloud computing system 1100 and the cloud services provided by the cloud computing system 1100 are shared by several organizations in a related community. The cloud services may also be provided under a hybrid cloud model, which is a combination of two or more of the aforementioned different models.

In some instances, any one of the applications 1114, services 1116, and databases 1118 made available to the client devices 1102-1108 via the networks 1110 from the cloud computing system 1100 is referred to as a "cloud service". Typically, servers and systems that make up the cloud computing system 1100 are different from the on-premises servers and systems of a customer. For example, the cloud computing system 1100 may host an application and a user of one of client devices 1102-1108 may order and use the application via the networks 1110.

The applications 1114 may include software applications that are configured to execute on the cloud computing system 1112 (e.g., a computer system or a virtual machine operating on a computer system) and be accessed, controlled, managed, etc. via the client devices 1102-1108. In some embodiments, the applications 1114 may include server applications and/or mid-tier applications (e.g., HTTP (hypertext transport protocol) server applications, FTP (file transfer protocol) server applications, CGI (common gateway interface) server applications, Java™ server applications, etc.). The services 1116 are software components, modules, application, etc. that are configured to execute on the cloud computing system 1112 and provide functionalities to the client devices 1102-1108 via the networks 1110. The services 1116 may be web-based services or on-demand cloud services.

The databases 1118 are configured to store and/or manage data that is accessed by the applications 1114, the services 1116, or the client devices 1102-1108. For instance, the rules repository 814 (see FIG. 8), etc. may be stored in the databases 1118. The databases 1118 may reside on a non-transitory storage medium local to (and/or resident in) the cloud computing system 1112, in a storage-area network (SAN), or on a non-transitory storage medium local located remotely from the cloud computing system 1112. In some embodiments, the databases 1118 may relational databases that are managed by a relational database management system (RDBMS), etc. The databases 1118 may be a column-oriented databases, row-oriented databases, or a combination thereof. In some embodiments, some or all of the databases 1118 are in-memory databases. That is, in some such embodiments, data for the databases 1118 are stored and managed in memory (e.g., random access memory (RAM)).

The client devices 1102-1108 are configured to execute and operate a client application (e.g., a web browser, a proprietary client application, etc.) that communicates with the applications 1114, services 1116, or databases 1118 via the networks 1110. This way, the client devices 1102-1108 may access the various functionalities provided by the applications 1114, services 1116, and databases 1118 while the applications 1114, services 1116, and databases 1118 are operating (e.g., hosted) on the cloud computing system 1100. The client devices 1102-1108 may be the computer system 1000 (see FIG. 10). Although the system 1100 is shown with four client devices, any number of client devices may be supported.

The networks 1110 may be any type of network configured to facilitate data communications among the client devices 1102-1108 and the cloud computing system 1112 using any of a variety of network protocols. The networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of modeling and generating smart contracts on a distributed ledger, the method being implemented by a computer system having a processor and a memory, the method comprising:
    receiving, by the computer system, a first user input including a plurality of rules, wherein the plurality of rules includes a plurality of if-then statements, and wherein the plurality of rules models a plurality of contract terms;
    receiving, by the computer system, a second user input that configures a plurality of configuration parameters for the plurality of rules that models the plurality of contract terms; and
    executing, by the computer system, a rules compiler, wherein executing the rules compiler includes reading the plurality of rules and the plurality of configuration parameters, and wherein executing the rules compiler includes:
        generating, by the rules compiler, a first computer program representing a rule façade program, wherein the rule façade program provides a plurality of public interfaces to a smart contract on the distributed ledger;
        generating, by the rules compiler, a second computer program representing a multi-sign wallet program, wherein the multi-sign wallet program includes a list of approvers for the smart contract, and wherein the rule façade program provides functional access to the multi-sign wallet program; and
        generating, by the rules compiler, a third computer program representing a rules contract program, wherein the rules contract program includes the plurality of rules that models the plurality of contract terms, and wherein the rules façade program provides functional access to the rules contract program:
    wherein the smart contract comprises the first computer program, the second computer program and the third computer program.

2. The method of claim 1, further comprising:
deploying the smart contract on the distributed ledger.

3. The method of claim 1, further comprising:
periodically monitoring the distributed ledger by the rule façade program, wherein monitoring the distributed ledger includes detecting a new block on the distributed ledger;
invoking, by the rule façade program, the rules contract program when the new block is detected.

4. The method of claim 1, further comprising:
generating, by the rules compiler, a fourth computer program representing an escrow account program, wherein the escrow account program identifies a sender address, a recipient address and an escrow amount,
wherein the smart contract comprises the first computer program, the second computer program, the third computer program and the fourth computer program.

5. The method of claim 4, further comprising:
receiving, by the computer system, a third user input that indicates deployment of a new version of the smart contract;
generating, by the rules compiler, an updated multi-sign wallet program related to the new version of the smart contract;
deploying, by a version manager program, the updated multi-sign wallet program;
instantiating, by the updated multi-sign wallet program, an updated escrow account program related to the new version of the smart contract;
generating, by the rules compiler, an updated rules contract program related to the new version of the smart contract; and
deploying, by the version manager program, the updated rules contract program.

6. The method of claim 4, further comprising:
detecting a failure in executing a transaction by the escrow account program;
periodically re-trying the transaction by the escrow account program when the failure in executing the transaction has been detected.

7. The method of claim 4, further comprising:
executing, by the escrow account program, a function to release the escrow amount to the recipient address when a condition of the smart contract is met.

8. The method of claim 1, further comprising:
receiving, by the computer system, a third user input that indicates deployment of a new version of the smart contract;
generating, by the rules compiler, an updated multi-sign wallet program related to the new version of the smart contract;
deploying, by a version manager program, the updated multi-sign wallet program;
generating, by the rules compiler, an updated rules contract program related to the new version of the smart contract; and
deploying, by the version manager program, the updated rules contract program.

9. The method of claim 1, wherein the rules compiler includes a rule parser, the method further comprising:
parsing, by the rule parser, the plurality of rules to generate an intermediate representation, wherein the intermediate representation corresponds to a structured model of a plurality of rule expressions of the plurality of rules, and wherein parsing the plurality of rule expressions includes performing one or more of lexical analysis, syntax analysis and semantic analysis.

10. The method of claim 1, wherein the rules compiler includes a code generator, the method further comprising:
storing a code template; and
converting, by the code generator, the plurality of rules into the rules contract program using the code template.

11. The method of claim 1, wherein the rules compiler includes a performance optimizer, the method further comprising:
generating, by the rules compiler, a first version of the rules contract program; and
optimizing, by the performance optimizer, the first version of the rules contract program, wherein optimizing the first version of the rules contract program includes removing a redundancy from the first version of the rules contract program and generating a second version of the rules contract program.

12. The method of claim 1, further comprising:
executing, by the computer system, a contract rules authoring tool, wherein the contract rules authoring tool generates the first user input by applying generative artificial intelligence to a business document.

13. The method of claim 1, wherein the rules compiler includes a generative artificial intelligence component, wherein generating the third computer program representing the rules contract program includes generating, by the generative artificial intelligence component using a trained large language model, the third computer program.

14. A non-transitory computer readable medium storing instructions that, when executed by a computer system having a processor and a memory, control the computer system to perform a method of modeling and generating smart contracts on a distributed ledger, the method comprising:
receiving, by the computer system, a first user input including a plurality of rules, wherein the plurality of rules includes a plurality of if-then statements, and wherein the plurality of rules models a plurality of contract terms;
receiving, by the computer system, a second user input that configures a plurality of configuration parameters for the plurality of rules that models the plurality of contract terms; and
executing, by the computer system, a rules compiler, wherein executing the rules compiler includes reading the plurality of rules and the plurality of configuration parameters, and wherein executing the rules compiler includes:
generating, by the rules compiler, a first computer program representing a rule façade program, wherein the rule façade program provides a plurality of public interfaces to a smart contract on the distributed ledger;
generating, by the rules compiler, a second computer program representing a multi-sign wallet program, wherein the multi-sign wallet program includes a list of approvers for the smart contract, and wherein the rule façade program provides functional access to the multi-sign wallet program; and
generating, by the rules compiler, a third computer program representing a rules contract program, wherein the rules contract program includes the plurality of rules that models the plurality of contract terms, and wherein the rules façade program provides functional access to the rules contract program;
wherein the smart contract comprises the first computer program, the second computer program and the third computer program.

15. The non-transitory computer readable medium of claim 14, wherein the method further comprises:
generating, by the rules compiler, an updated multi-sign wallet program related to the new version of the smart contract;
deploying, by a version manager program, the updated multi-sign wallet program;
generating, by the rules compiler, an updated rules contract program related to the new version of the smart contract; and
deploying, by the version manager program, the updated rules contract program.

16. The non-transitory computer readable medium of claim 14, wherein the method further comprises:
periodically monitoring the distributed ledger by the rule façade program, wherein monitoring the distributed ledger includes detecting a new block on the distributed ledger;
invoking, by the rule façade program, the rules contract program when the new block is detected.

17. The non-transitory computer readable medium of claim 14, wherein the rules compiler includes a code generator, and wherein the method further comprises:
storing a code template; and
converting, by the code generator, the plurality of rules into the rules contract program using the code template.

18. A computer system for modeling and generating smart contracts on a distributed ledger, the computer system comprising:
a memory; and
a processor,
wherein the processor is configured to control the computer system to receive a first user input including a plurality of rules, wherein the plurality of rules includes a plurality of if-then statements, and wherein the plurality of rules models a plurality of contract terms;
wherein the processor is configured to control the computer system to receive a second user input that configures a plurality of configuration parameters for the plurality of rules that models the plurality of contract terms;
wherein the processor is configured to control the computer system to execute a rules compiler, wherein executing the rules compiler includes reading the plurality of rules and the plurality of configuration parameters, and wherein executing the rules compiler includes:
generating, by the rules compiler, a first computer program representing a rule façade program, wherein the rule façade program provides a plurality of public interfaces to a smart contract on the distributed ledger;
generating, by the rules compiler, a second computer program representing a multi-sign wallet program, wherein the multi-sign wallet program includes a list of approvers for the smart contract, and wherein the rule façade program provides functional access to the multi-sign wallet program; and
generating, by the rules compiler, a third computer program representing a rules contract program, wherein the rules contract program includes the plurality of rules that models the plurality of contract terms, and wherein the rules façade program provides functional access to the rules contract program; and
wherein the smart contract comprises the first computer program, the second computer program and the third computer program.

19. The computer system of claim 18, wherein the processor is configured to control the computer system to receive a third user input that indicates deployment of a new version of the smart contract;
wherein the processor is configured to control the computer system to generate, by the rules compiler, an updated multi-sign wallet program related to the new version of the smart contract;
wherein the processor is configured to control the computer system to deploy, by a version manager program, the updated multi-sign wallet program;
wherein the processor is configured to control the computer system to generate, by the rules compiler, an updated rules contract program related to the new version of the smart contract; and
wherein the processor is configured to control the computer system to deploy, by the version manager program, the updated rules contract program.

20. The computer system of claim 18, wherein the processor is configured to control the computer system to periodically monitor the distributed ledger by the rule façade program, wherein monitoring the distributed ledger includes detecting a new block on the distributed ledger; and
wherein the processor is configured to control the computer system to invoke, by the rule façade program, the rules contract program when the new block is detected.

* * * * *